United States Patent
Kim et al.

(10) Patent No.: US 11,755,073 B2
(45) Date of Patent: Sep. 12, 2023

(54) ELECTRONIC DEVICE COMPRISING FLEXIBLE DISPLAY, AND ELECTRONIC COMPONENT ARRANGEMENT STRUCTURE APPLIED TO SAME

(71) Applicant: Samsung Electronics Co., Ltd., Gyeonggi-do (KR)

(72) Inventors: Gidae Kim, Gyeonggi-do (KR); Jungjin Kim, Gyeonggi-do (KR); Jungsik Park, Gyeongg-do (KR); Hongsik Park, Gyeongg-do (KR); Hyoseok Na, Gyeonggi-do (KR); Jongchul Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 18/092,699

(22) Filed: Jan. 3, 2023

(65) Prior Publication Data

US 2023/0144130 A1     May 11, 2023

Related U.S. Application Data

(63) Continuation of application No. 16/959,300, filed as application No. PCT/KR2019/000384 on Jan. 10, 2019, now Pat. No. 11,561,582.

(30) Foreign Application Priority Data

Jan. 12, 2018   (KR) .................. 10-2018-0004669

(51) Int. Cl.
*G06F 1/00*    (2006.01)
*G06F 1/16*    (2006.01)
*H04M 1/02*   (2006.01)

(52) U.S. Cl.
CPC .......... *G06F 1/1652* (2013.01); *G06F 1/1643* (2013.01); *H04M 1/0268* (2013.01)

(58) Field of Classification Search
CPC .. G06F 1/1652; G06F 1/1624; H04M 1/0237; H04M 1/0268; H04M 1/0277; G09F 9/301; H05K 9/0064
See application file for complete search history.

(56) References Cited

U.S. PATENT DOCUMENTS 10,817,022 B2   10/2020   Cho et al.
2003/0048256 A1   3/2003   Salmon
(Continued)

FOREIGN PATENT DOCUMENTS

KR   10-2003-0085828   11/2003
KR   10-2010-0028343   3/2010
(Continued)

OTHER PUBLICATIONS

PCT/ISA/210 Search Report issued on PCT/KR2019/000384, Apr. 23, 2019, pp. 5.
(Continued)

*Primary Examiner* — Pete T Lee
(74) *Attorney, Agent, or Firm* — The Farrell Law Firm, P.C.

(57) ABSTRACT

Disclosed is a portable communication device that includes a housing including a first housing portion and a second housing portion at least partially overlapped and slidable with each other; a rollable module accommodated in the housing substantially between the first housing portion and the second housing portion, the rollable module configured to slide the first housing portion or the second housing portion with respect to each other; and a flexible display accommodated in the housing such that, when in a closed state in which the first housing portion or the second housing portion is not slid with respect to each other, a first display portion of the flexible display is visually exposed via a first surface of the housing and a second display portion of the (Continued)

flexible display is visually exposed via a second surface of the housing opposite to the first surface.

20 Claims, 28 Drawing Sheets

(56) References Cited

U.S. PATENT DOCUMENTS

| | | | |
|---|---|---|---|
| 2006/0038745 A1* | 2/2006 | Naksen | G06F 1/1624 257/40 |
| 2008/0144265 A1* | 6/2008 | Aoki | G06F 1/1601 361/679.04 |
| 2010/0167791 A1 | 7/2010 | Lim | |
| 2011/0176260 A1 | 7/2011 | Walters et al. | |
| 2015/0261376 A1 | 9/2015 | Kim | |
| 2015/0316962 A1* | 11/2015 | Howes | G03B 21/58 16/87.2 |
| 2016/0143131 A1 | 5/2016 | Ahn | |
| 2017/0103735 A1 | 4/2017 | Oh | |
| 2017/0140504 A1 | 5/2017 | Jeong et al. | |
| 2017/0212556 A1 | 7/2017 | Jovanovic | |
| 2018/0011514 A1 | 1/2018 | Yoo et al. | |

FOREIGN PATENT DOCUMENTS

| | | |
|---|---|---|
| KR | 10-2010-0079100 | 7/2010 |
| KR | 10-2011-0082943 | 7/2011 |
| KR | 10-2016-0058329 | 5/2016 |
| KR | 10-2016-0097035 | 8/2016 |
| KR | 10-2016-0141255 | 12/2016 |
| KR | 10-2017-0058816 | 5/2017 |
| KR | 10-1769941 | 8/2017 |

OTHER PUBLICATIONS

PCT/ISA/237 Written Opinion issued on PCT/KR2019/000384, Apr. 23, 2019, pp. 5.

European Search Report dated Nov. 11, 2020 issued In counterpart application No. 19738839.0-1216, 7 pages.

Korean Office Action dated Nov. 5, 2021 issued in counterpart application No. 10-2018-0004669, 11 pages.

KR Notice of Patent Grant dated May 25, 2022 issued in counterpart application No. 10-2018-0004669, 11 pages.

* cited by examiner

ELECTRONIC DEVICE COMPRISING FLEXIBLE DISPLAY, AND ELECTRONIC COMPONENT ARRANGEMENT STRUCTURE APPLIED TO SAME

PRIORITY

This application is a Continuation of U.S. patent application Ser. No. 16/959,300, filed with the U.S. Patent and Trademark Office on Jun. 30, 2020, as a National Phase entry of International Application No. PCT/KR2019/000384, which was filed on Jan. 10, 2019, and claims priority to Korean Patent Application No. 10-2018-0004669, filed in the Korean Intellectual Property Office on Jan. 12, 2018, the content of each of which is incorporated herein by reference.

BACKGROUND

1. Field

Various embodiments of the present disclosure relate to an electronic device including a flexible display, and an electronic component arrangement structure applied thereto.

2. Related Art

With a significant decrease in a functional gap of each manufacturer, electronic devices have recently become slimmer to satisfy preferences of consumers, and there is competition to improve user convenience. For example, the electronic device which is gradually becoming smaller and slimmer cannot but have a reduced display area, and it may be necessary to secure a display area having a large screen to accommodate various functions.

In general, portable electronic devices have progressed in various forms to secure a more extended display area without affecting portability. For example, the electronic device may include a slide type electronic device which is unfolded in a sliding manner when used at a position where a first body and a second body overlap, or a foldable type electronic device which uses a flexible display to allow a first body and a second body to overlap or be unfolded.

Disadvantageously, however, the electronic devices cannot use a hidden display area as a rear display of the electronic device when folded for the purpose of carrying. In addition, when part of a display of the electronic device is used in part as the rear display, there may be difficulty in an arrangement between an internal electronic component (e.g., an antenna, etc.) and a Printed Circuit Board (PCB).

SUMMARY

The disclosure has been made to address at least the above-mentioned problems and/or disadvantages and to provide at least the advantages described below.

According to an embodiment, a portable communication device is provided that includes a housing including a first housing portion and a second housing portion at least partially overlapped and slidable with each other; a rollable module accommodated in the housing substantially between the first housing portion and the second housing portion, the rollable module configured to slide the first housing portion or the second housing portion with respect to each other; and a flexible display accommodated in the housing such that, when in a closed state in which the first housing portion or the second housing portion is not slid with respect to each other, a first display portion of the flexible display is visually exposed via a first surface of the housing and a second display portion of the flexible display is visually exposed via a second surface of the housing opposite to the first surface.

According to various embodiments, there may be provided an electronic device including a flexible display capable of having a display area on a first face and a second face facing the first face, and an electronic component arrangement structure applied thereto.

According to various embodiments, there may be provided an electronic device including a flexible display capable of securing a degree of freedom in mounting an internal electronic component, and an electronic component arrangement structure applied thereto.

According to various embodiments of the present disclosure, an electrical connection member of an electronic device is evasively disposed around at least part of a display area, thereby securing a degree of freedom in mounting an electronic component disposed inside the electronic device.

BRIEF DESCRIPTION OF DRAWINGS

The above and/or additional aspects, features and advantages of certain embodiments of the present disclosure will become apparent and readily understood from the following description, taken in conjunction with the accompanying drawings, in which.

DETAILED DESCRIPTION

Figure 1:
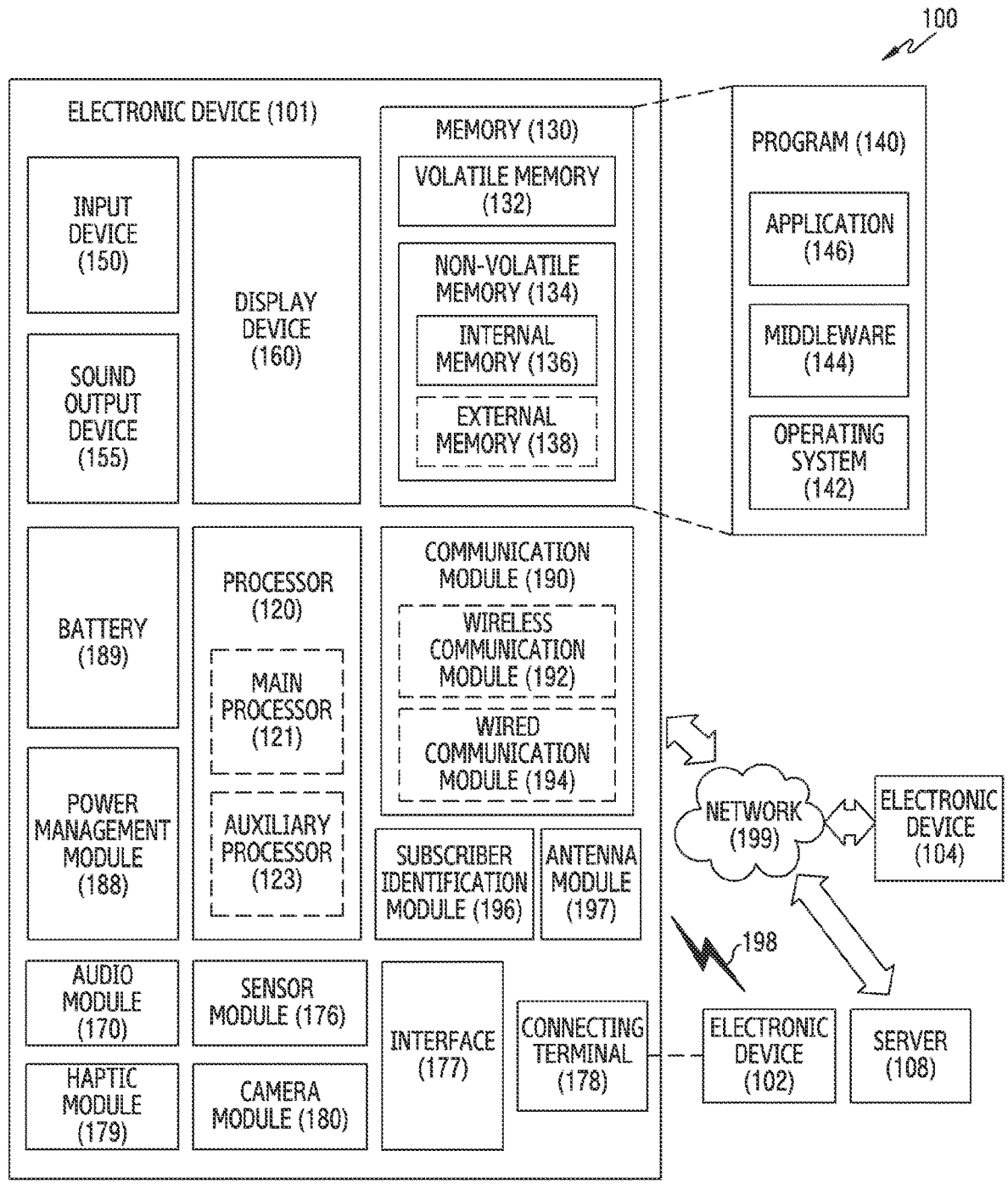
FIG. 1 is a block diagram of an electronic device in a network environment, including an extendable flexible display, according to various embodiments of the present disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
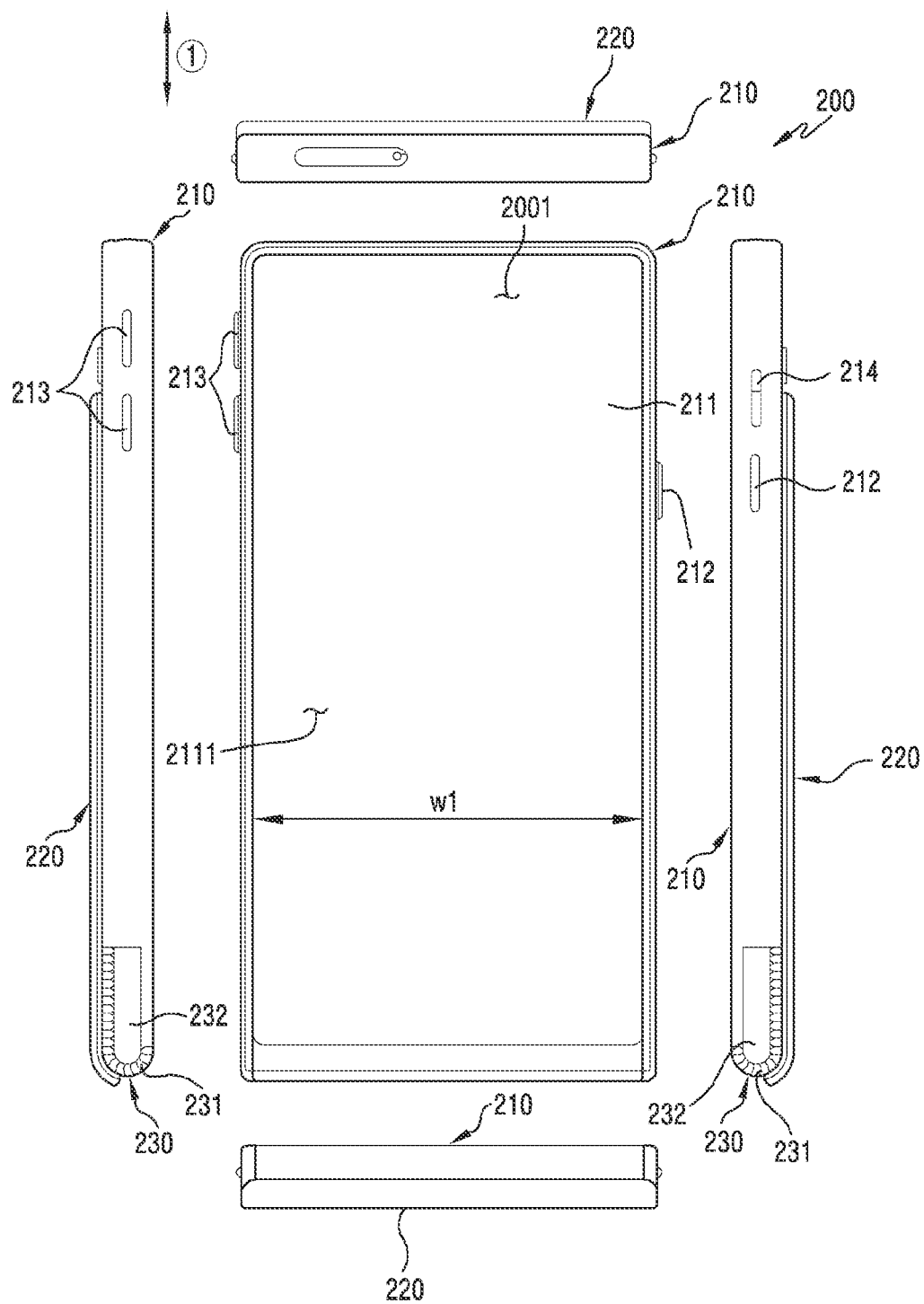
FIG. 2A and FIG. 2B illustrates a change relationship of a display area of a front display according to various embodiments of the present disclosure.

According to various embodiments of the present disclosure, the processor 120 may use the sensor module 176 (e.g., a hall sensor, a magnetic reed switch, or the like) to detect an open state of a second structure (e.g., a second structure 220 of FIG. 2A) (e.g., a second plate) with respect to a first structure (e.g., a first structure 210 of FIG. 2A) (e.g., a first plate), thereby controlling a size of a display area depending on an area of a display (e.g., a display 211 of FIG. 2A) extending to a front face of an electronic device (e.g., aa electronic device 200 of FIG. 2A). According to an embodiment, the processor 120 may detect whether the second structure is open or closed with respect to the first structure, thereby controlling a size of a display area disposed to a rear face of the electronic device (e.g., a rear display area 2112 of FIG. 3A). According to an embodiment, the electronic device may provide control to display a corresponding image (e.g., a preview image) to a display area disposed to the rear face in response to a currently running application (e.g., a rear camera capture function).

Figure 2B:
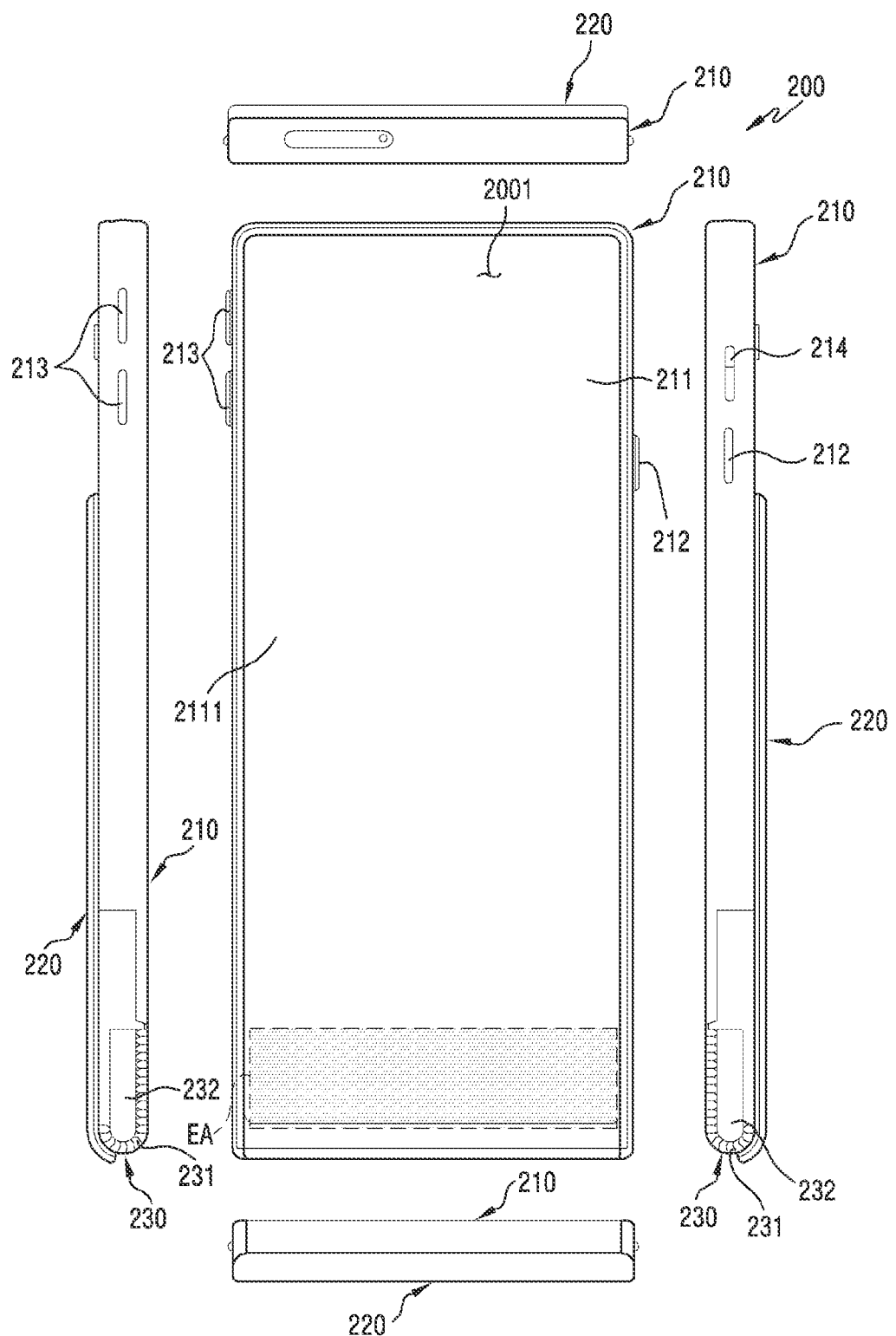
Figure 3A:
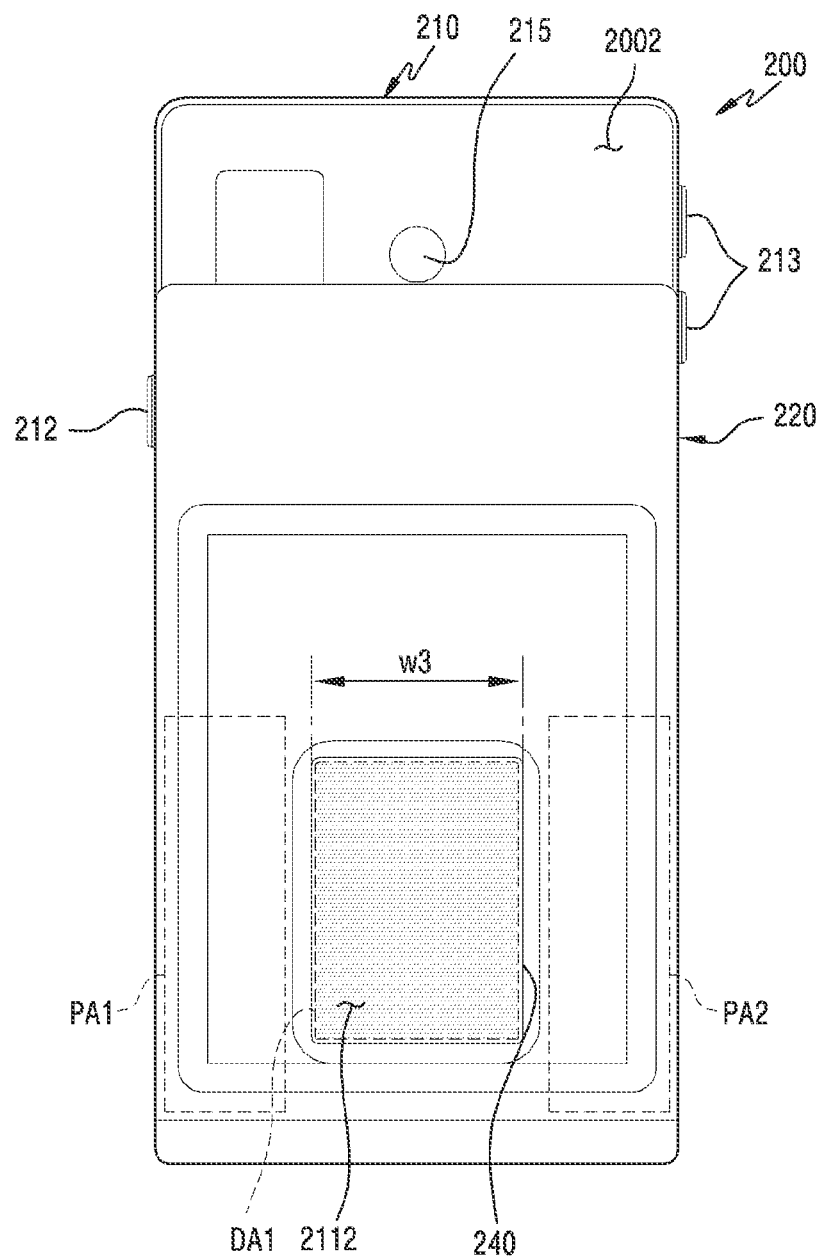
FIG. 3A and FIG. 3B illustrates a change relationship of a display area of a rear display according to various embodiments of the present disclosure.
Figure 3B:
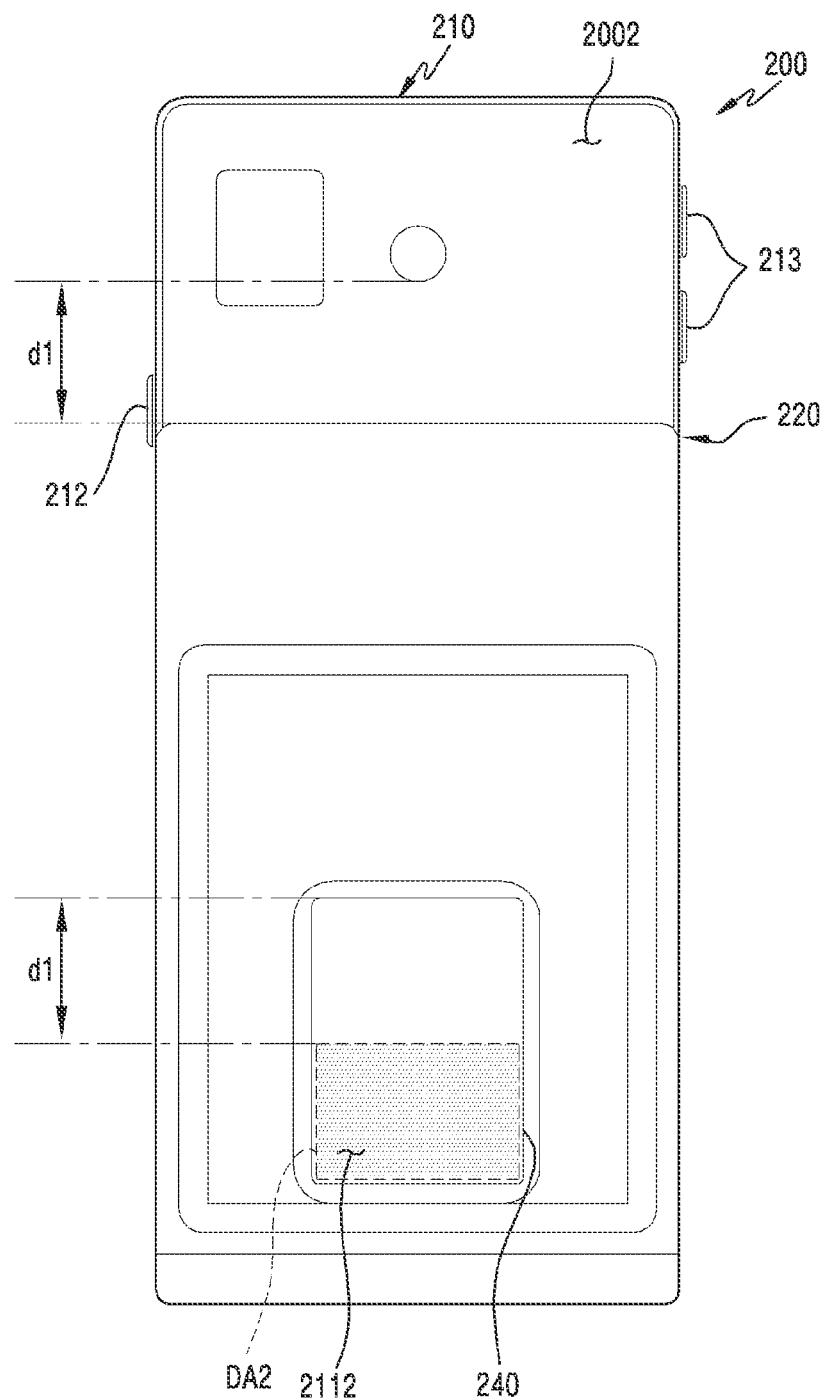

FIG. 2A and FIG. 2B illustrate a change relationship of a display area of a front display according to various embodiments of the present disclosure. FIG. 3A and FIG. 3B illustrate a change relationship of a display area of a rear display according to various embodiments of the present disclosure.

An electronic device 200 of FIG. 2A to FIG. 3B may be at least in part similar to the electronic device 101 of FIG. 1, or may include other embodiments of the electronic device.

FIG. 2A illustrates a state where a first structure 210 is closed with respect to a second structure 220, and FIG. 2B illustrates a state where the first structure 210 is open with respect to the second structure 220.

Referring to FIG. 2A and FIG. 2B, the electronic device 200 may include the first structure 210 and the second structure 220 disposed to be movable in the first structure 210. According to an embodiment, the first structure 210 may be disposed such that a reciprocating motion is possible by a specific distance in a direction CD as illustrated with respect to the second structure 220.

According to various embodiments, the electronic device 200 may include a display 211 disposed to a front face 2001 (e.g., a first face) of the first structure 210. According to an embodiment, the display 211 may include a front display area 2111 exposed through the front face 2001 of the first structure. According to an embodiment, the electronic device 200 may include a first key button 212 or second key button 213 disposed to at least one of left and right side faces. According to an embodiment, the first key button 212 or the second key button 213 may be disposed to the side face of the electronic device 200 in an exposed or protruding manner. According to an embodiment, the first key button 212 may be a power button. For another example, the second key button 21 may be a volume control button. According to an embodiment, the electronic device 200 may include at least one speaker device 214 disposed to the side face. According to an embodiment, the speaker device 214 may be disposed at various positions in addition to a display arrangement area of the electronic device.

According to various embodiments, the electronic device 200 may include a rollable module 230 disposed to a border of the first structure 210 and second structure 220. According to an embodiment, the rollable module 230 may be relatively movably disposed between the first structure 210 and the second structure 220. The rollable module 230 may include a multi-joint module 231 disposed in a rollable manner to an end portion of an inner support member 232 partially exposed to a side face. According to an embodiment, the multi-joint module 231 moves together when the first structure 210 moves reciprocally with respect to the second structure 220 in the direction ①, thereby guiding the front display 211.

According to various embodiments, when the electronic device changes to a state where the first structure 210 is open with respect to the second structure 220 by a specific length in the direction ①, a display area of the front display 211 disposed to the front face 2001 of the electronic device 200 may extend by an area EA having a specific size.

FIG. 3A illustrates a state of the electronic device 210 when the first structure 210 is closed with respect to the second structure 220, and FIG. 3B illustrates a state of the electronic device 200 when the first structure 210 is open with respect to the second structure 220.

Referring to FIG. 3A and FIG. 3B, the electronic device 200 may include the second structure 220 disposed to a rear face 2002 in a relatively movable manner with respect to the first structure 210. According to an embodiment, the electronic device 200 may include a rear camera device 215 disposed to the first structure 210 in the rear face 2002. According to an embodiment, the electronic device 200 may include a real display area 2112 extending from a front display area (e.g., the front display area 2111 of FIG. 2A) of a display (e.g., the display 211 of FIG. 2A) visible through a through-hole 240 constructed in the second structure 220 of the rear face 2002. According to an embodiment, although the electronic device 200 includes the front display area 2111 and the rear display area 2112 respectively in the front face 2001 and the rear face 2002, one display (e.g., the display 211 of FIG. 2A) may be extendedly disposed inside the electronic device 200 so as to be rollable from the front face 2001 to the rear face 2002 of the electronic device 200. According to an embodiment, when the rear display area 2112 of the electronic device 200 maintains a state where the first structure 210 is closed with respect to the second structure 220, a full area DA1 of the rear display area 2112 may be a display area. According to an embodiment, when the rear display area 2112 of the electronic device 200 transitions to a state where the first structure 210 is open with respect to the second structure 220, it may be displayed by changing to a display area DA2 less than the full display area DA1 of the rear display area 211. However, without being limited thereto, a display area displayed to the rear display area 2112 may be defined as various display areas according to a design of a designer or a setting of a user.

According to various embodiments, the rear display area 2112 may be constructed to have a width w3 less than a width (e.g., a width w1 of FIG. 2A) of the front display area 2111. According to an embodiment, the electronic device 200 may be configured such that an electrical connection member (e.g., an FPCB 482 of FIG. 4) passes by a surrounding area (e.g., PA1 or PA2 of FIG. 3A) of the rear display 240, in order to achieve an electrical connection between a Printed Circuit Board (PCB) (e.g., a PCB 441 of FIG. 4) disposed to the first structure 210 in one end (e.g., an upper end area or an upper side) of the electronic device 200 and electronic components (e.g., an antenna module, a microphone module, a speaker module, an interface connector port, various sockets, or an ear jack assembly) in the other end (e.g., a lower end area or a lower side) of the electronic device 200. Accordingly, a degree of freedom in mounting an electronic component inside the electronic device is improved, which facilitates a design of the electronic device and contributes to improvement of a design or performance of each electronic component.

Figure 4:
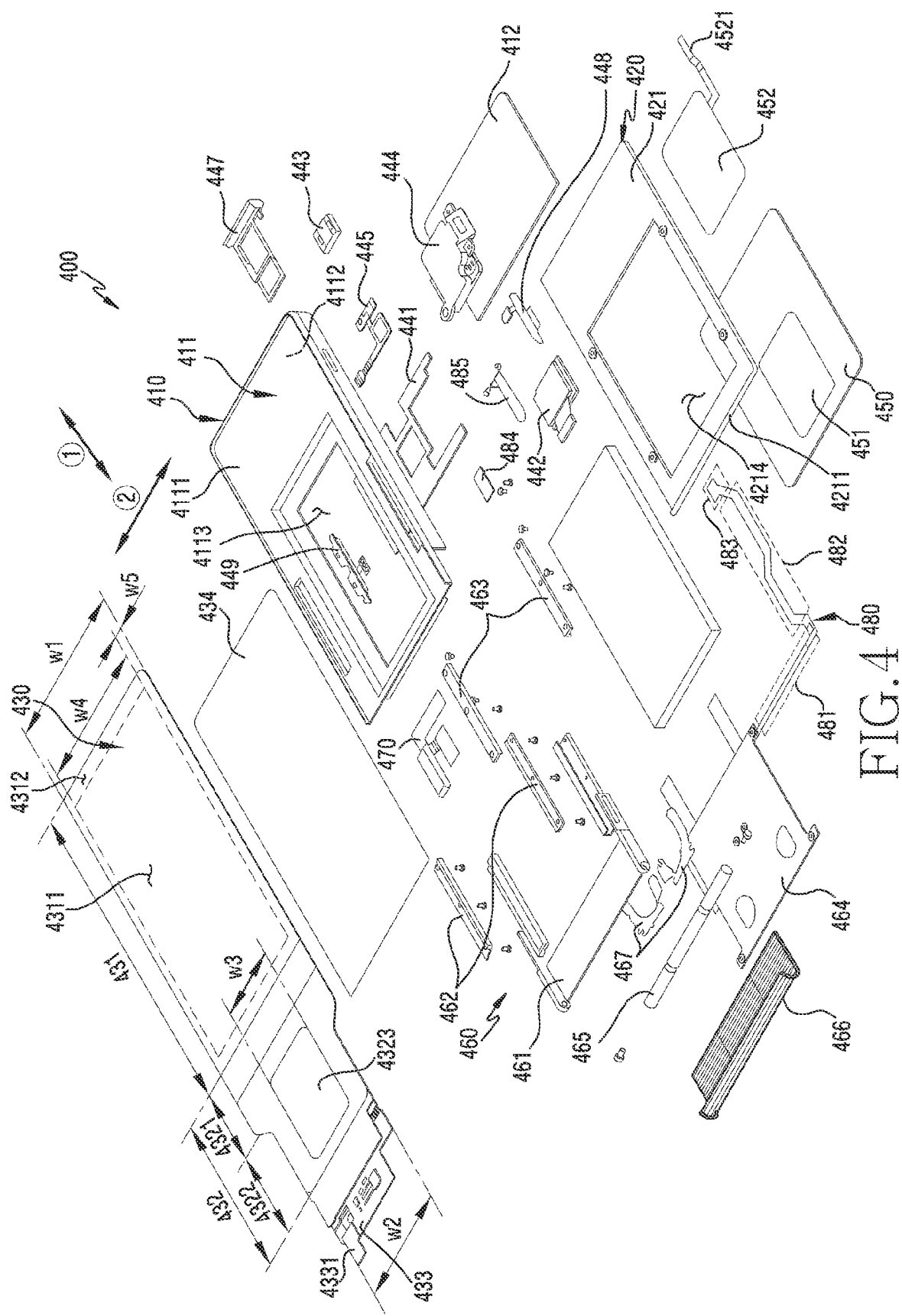
FIG. 4 is an exploded perspective view of an electronic device according to various embodiments of the present disclosure.

FIG. 4 is an exploded perspective view of an electronic device according to various embodiments of the present disclosure.

An electronic device 400 of FIG. 4 may be at least in part similar to the electronic device 101 of FIG. 1 or the electronic device 200 of FIG. 2A to FIG. 3B, or may include other embodiments of the electronic device.

Referring to FIG. 4, the electronic device 400 may include a first structure 410 including a first plate 411 having a first face 4111 and a second face 4112 facing away from the first face 4111. According to an embodiment, the electronic device 400 may include a second structure 420 including a second plate 421 facing the second face 4112 of the first plate 411 and a first side wall 4211 extending from the second plate 421. According to an embodiment, the electronic device 400 may include a display 430 (e.g., a flexible touchscreen display) disposed to the first face 4111 of the first plate 411 and interposed at least in part between the second plate 421 and the second face 4112 of the first plate 411 through the first side wall 4211. According to an embodiment, the electronic device 400 may include a rollable module 460 for slidably coupling the first plate 411 and the second plate 421 and for guiding a movement of the display 430 disposed through the first side wall 4211.

According to various embodiments, the second plate 421 (e.g., the second plate 421 of FIG. 5A) and the first side wall 4211 (e.g., the first side wall 4211 of FIG. 5A) may construct the second structure 420. According to an embodiment, the first structure 410 is movable in an open or closed state with respect to the second structure 420 in a first direction (e.g., a direction ① of FIG. 4), and may be configured such that the first structure 410 is placed at a first distance (e.g., a first distance L1 of FIG. 6) from the first side wall 4211 when in the closed state, and is placed at a second distance (e.g., a second distance L2 of FIG. 6), which is greater than the first distance, from the first side wall 4211 when in the open state.

According to various embodiments, the display 430 may include a planar portion 431 extending across at least part of the first face 4111 of the first plate 411 such that the extended portion is mounted to the first face 4111 of the first plate 4111 and having a first width W1 in a second direction (e.g., a direction ② of FIG. 4) perpendicular to the first direction, and a bendable portion 432 extending from the planar portion 431 to a space between the first side wall 4211 and the first structure 410 when in the closed state. According to an embodiment, the bendable portion 432 may include a first portion 4321 extending from one end of the planar portion 431 and having the same width as the first width W1, and a second portion 4322 extending from the first portion 4321 and facing the second plate 421. According to an embodiment, the second portion 4322 may have a second width W2 less than the first width W1. According to an embodiment, the second portion 4322 of the bendable portion 432 may be exposed at least in part through a through-hole 451 disposed to the second plate 421. According to an embodiment, the display area 4323 disposed to the bendable portion 432 may be disposed through an opening 4214 of the second plate 421. According to an embodiment, the display area 4323 may have a third width W3 substantially similar to that of the through-hole 451 disposed to a window cover 450. According to an embodiment, the third width W3 may be less than the second width W2. According to an embodiment, the planar portion 431 may include an active area 4311 having a fourth width W4 and an inactive area 4312 adjacent to the active area 4311 in a first direction (e.g., the direction CD of FIG. 4) and having a fifth width W5, and the width W2 of the first portion 4321 of the bendable portion 432 may be less than the fourth width W4 of the active area 4311. According to an embodiment, in a case where the display 430 is viewed from above the first plate 411, when the first structure 410 moves from a closed state to an open state, the first portion 4321 of the bendable portion 432 may be pulled by a predetermined amount from a space between the first side wall 4211 and the first structure 410 to construct substantially a plane between the planar portion 431 and the first side wall 4211.

Figure 8A:
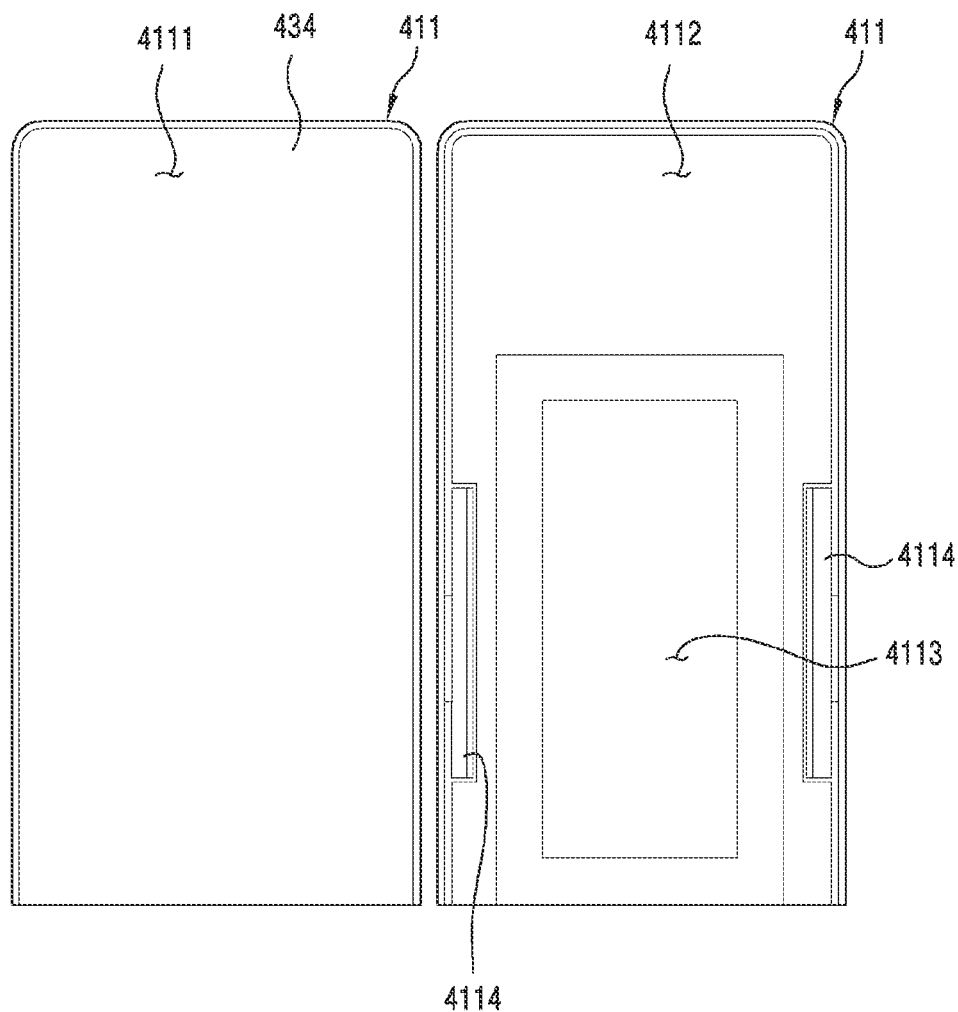
FIG. 8A illustrates a state where a front support member and a battery are mounted to a first plate according to various embodiments of the present disclosure.
Figure 8B:
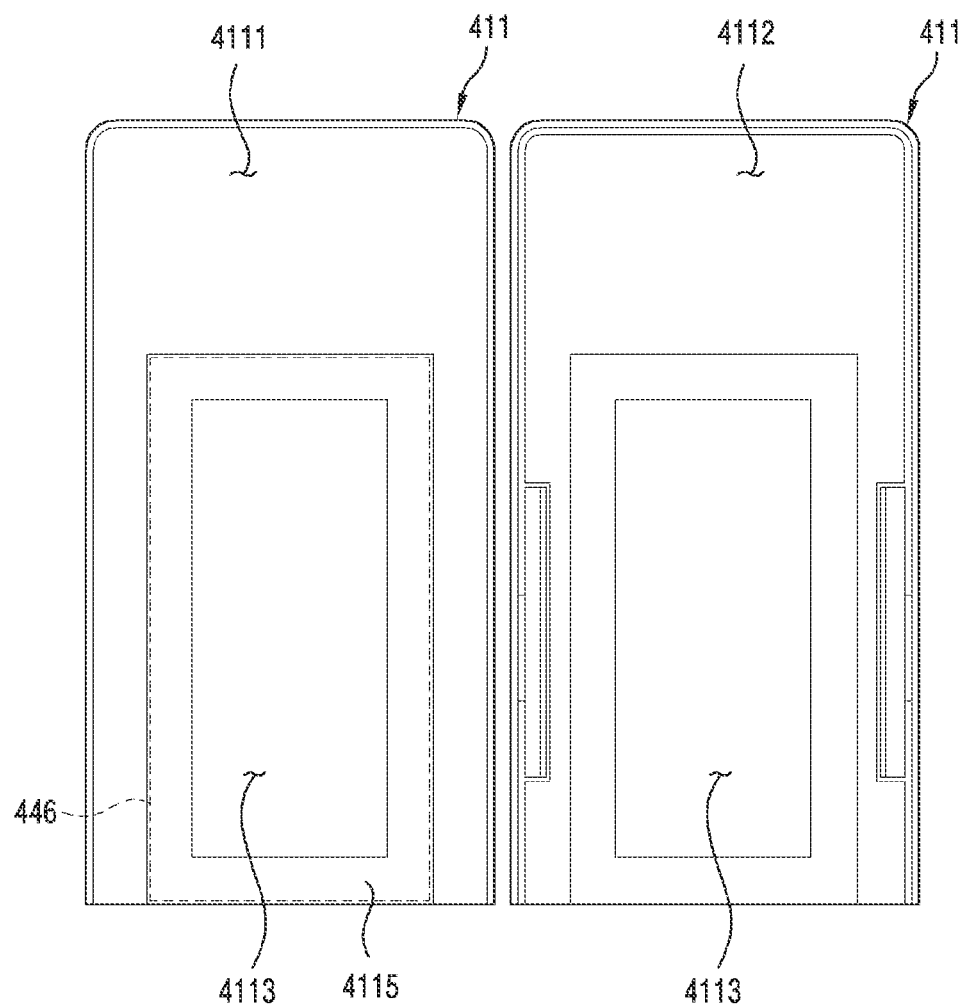
FIG. 8B illustrates a state where a front support member and a battery are mounted to a first plate according to various embodiments of the present disclosure.

According to various embodiments, the first structure 410 may include a battery mounting unit (e.g., a battery mounting unit 4115 of FIG. 8B). The battery mounting unit may include, for example, an opening 4113 (e.g., a swelling hole). According to an embodiment, the electronic device 400 may include a front support member 434 disposed between the first plate 411 and the planar portion 431 of the display 430 to support the planar portion 431 of the display 430. According to an embodiment, the front support member 434 may be attached to the first face 4111 of the front support member 434 by means of screwing, bonding, or taping.

According to various embodiments, the window cover 450 capable of covering the opening 4214 may be disposed to the second plate 421. According to an embodiment, the window cover 450 may include the through-hole 451 (e.g., a window constructed to be substantially transparent) corresponding to a display area 4323 disposed to the bendable portion 432 of the display 430. The through-hole 451 or other areas may be constructed of a translucent material so that internal components are not visible when the first structure 410 is open. According to an embodiment, a touch sensor 452 may be disposed to an area corresponding to the through-hole 451, and a connector 4521 of the touch sensor 452 may be electrically coupled to a PCB 441 through a connector 4331 together with a circuit portion 433 of the display 430.

According to various embodiments, a rear window 412 may be disposed to overlap at least in part with the second plate 421 in the second face 4112 of the first plate 411. According to an embodiment, the electronic device 400 may have a plurality of electronic components disposed to a space between the rear window 412 and the first plate 411. According to an embodiment, the electronic components may include the PCB 441, a camera module 442, a receiver 443, a speaker 444, a sensor module 445, a card tray 447, or one or more key modules 448 and 449. According to an embodiment, the sensor module 445 may include, for example, an illuminance sensor (e.g., an optical sensor), a proximity sensor (e.g., an optical sensor), an infrared sensor, an ultrasonic sensor, a fingerprint recognition sensor, a face recognition sensor, or an iris recognition sensor. According to an embodiment, the key modules 448 and 449 may include a power key module 448 or a volume control key module 449.

According to various embodiments, the rollable module 460 may include a sub support member 464 fixed to the second plate 421, an inner support member 461 mutually movably disposed between the sub support member 464 and the second face 4112 of the first plate 411, a roller 465 rotatably disposed by being constructed to have a length corresponding to the first side wall 4211 at an end portion of the inner support member 461, a multi-joint module 466 for guiding the rear face of the display 430 under the guidance of the roller 465, a pair of first rails 462 disposed between the inner support member 461 and the sub support member 464, and a second rail 463 disposed between the inner support member 461 and the second face 4112 of the first plate 411. According to an embodiment, the first rail 462 and the second rail 463 may be disposed to induce a relative sliding motion with respect to the sub support member 464 and the first plate 411. According to an embodiment, the multi-joint module 466 may be disposed to be bent along an outer circumferential face of the roller 465 since a plurality of unit multi bars are connected in an interworking manner. According to an embodiment, a bendable portion of the display 430 may be guided to be rolled (or bent) by an outer face of the multi-joint module 466, and thus an end portion thereof may be fixed to the sub support member 464 disposed between the second face 4112 of the first plate 411 and the second plate 421. According to an embodiment, the electronic device 400 may include at least one actuator 467 disposed between the inner support member 461 and the sub support member 464 and/or between the inner support member 461 and the first plate 411. According to an embodiment, the actuator 467 may persistently provide pressing force to the first structure 410, which is to be open or closed in a sliding manner with respect to the second structure 420, in a direction of being open or closed based on a specific inflection point.

According to various embodiments, the electronic device 400 may include an antenna module 480. According to an embodiment, the antenna module 480 may be disposed to, for example, the first side wall 4211 of the second plate 421. According to an embodiment, the antenna module 480 may include a radiation pattern 481 disposed to an inner face of the first side wall 4211, an FPCB 482 extending from the radiation pattern 481 to the vicinity of the PCB 441, and a connector 483 disposed to an end portion of the FPCB 482. According to an embodiment, the radiation pattern 481 may be disposed to the inner face of the first side wall 4211 in a Laser Direct Structuring (LDS) form, a Thin Film Antenna (TFA) form, a Flexible Printed Circuit Board (FPCB) form, or a Steel Use Stainless (SUS) form. According to an embodiment, the FPCB 482 of the antenna module 480 may be disposed by avoiding the through-hole 451 of the window cover 450. The FPCB 482 of the antenna module 480 may be electrically coupled to a sub PCB 484 disposed to the sub support member 464 in the vicinity of the PCB 441. According to an embodiment, the sub PCB 484 may be electrically coupled to a wireless communication circuit (e.g., RFIC) of the PCB 441 by means of a coaxial cable 485 electrically coupled thereto. For example, the radiation pattern 481 may be electrically coupled to the wireless communication circuit through the FPCB 482, the connector 483, the sub PCB 484, the coaxial cable 485, and the PCB 441. According to an embodiment, since the sub support member 464 having the sub PCB 484 fixed thereto moves together when the first structure 410 is open or closed, the coaxial cable 485 may be constructed of a material having high flexibility. However, without being limited thereto, the coaxial cable 485 may be replaced with an FPCB having high flexibility.

According to various embodiments, in the bendable portion 432 of the display 430, the circuit portion 433 may be fixed at least in part to the sub support member 464. The connector 4331 extending from the circuit portion 433 may be electrically coupled to the connector 4521 of the touch sensor 452 or the PCB 441 fixed to the first plate 411 by means of an electrical connection member 470. According to an embodiment, since a distance between the PCB 441 and the circuit portion 433 of the display 430 fixed to the sub support member 464 changes depending on the opening or closing of the first structure 410, the electrical connection member 470 may include an FPCB having high flexibility to accommodate this.

Figure 5A:
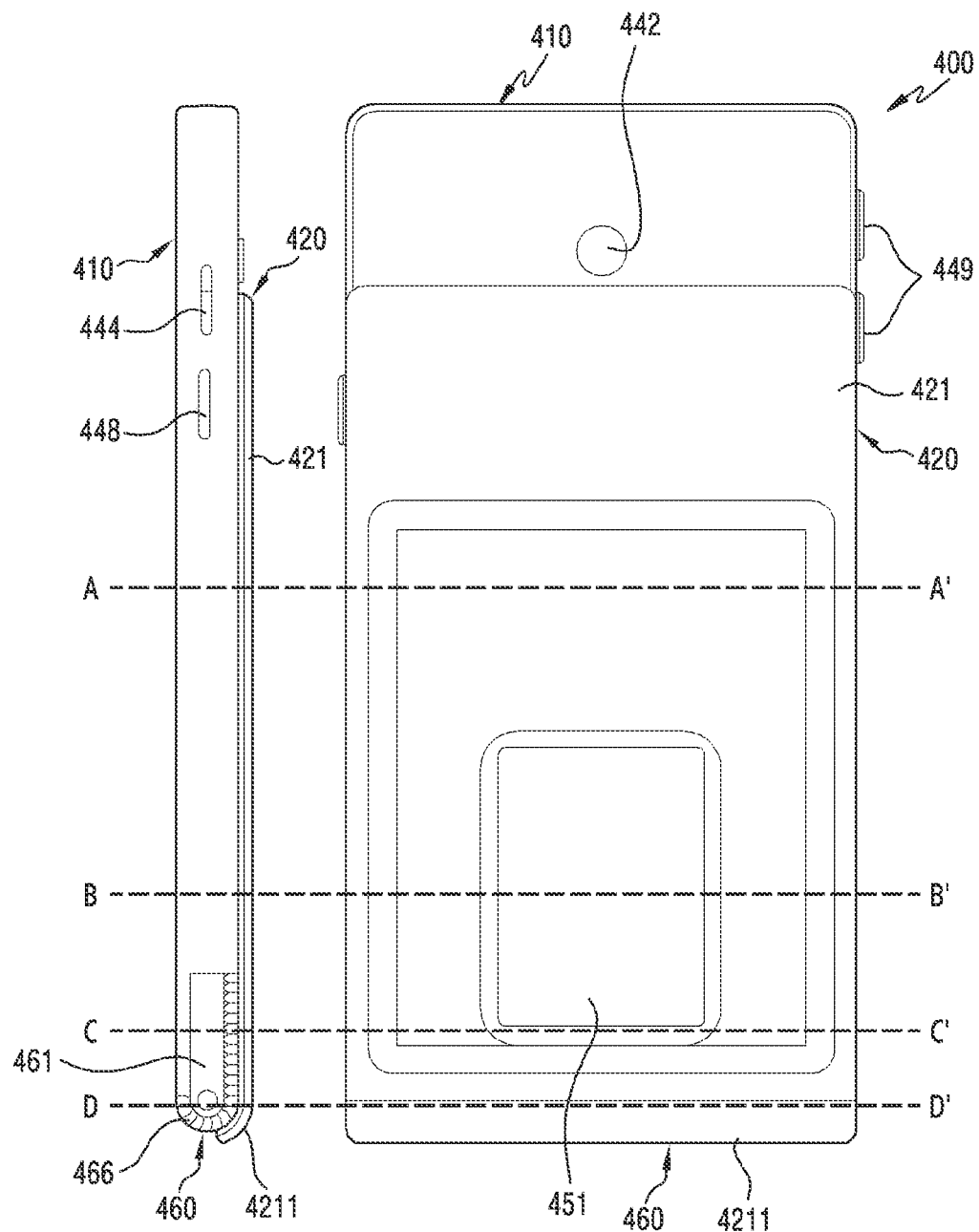
FIG. 5A illustrates a rear face and side face of an electronic device according to various embodiments of the present disclosure.

FIG. 5A illustrates a rear face and side face of an electronic device according to various embodiments of the present disclosure. FIG. 5B to FIG. 5E are cutaway cross-sectional views of various portions of FIG. 5A according to various embodiments of the present disclosure.

Figure 5B:
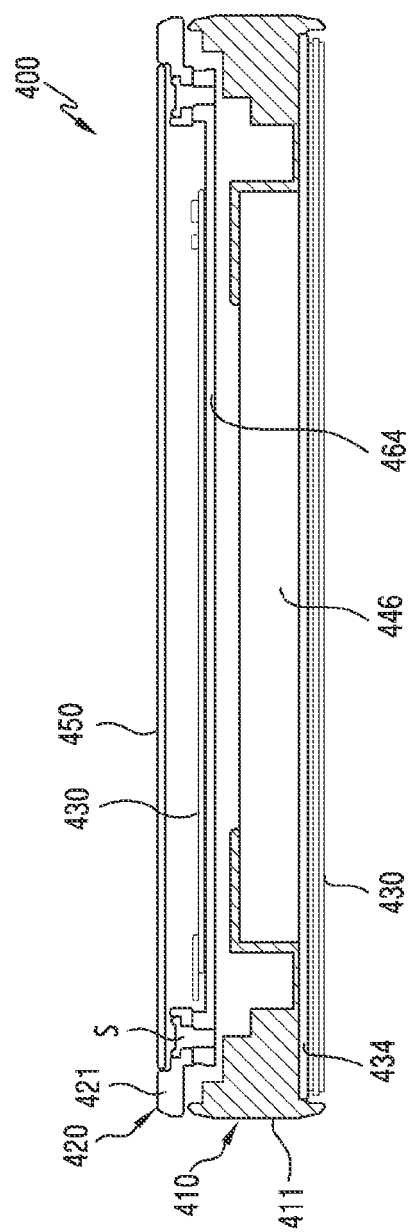
FIG. 5B is a cutaway cross-sectional view illustrating a portion of FIG. 5A according to various embodiments of the present disclosure.

FIG. 5B is a cross-sectional view cut along the line A-A' of FIG. 5A.

Referring to FIG. 5B, a battery 446 may be disposed to the first plate 411 of the first structure 410. After the battery 446 is disposed, the front support member 434 may be disposed to an upper portion thereof. According to an embodiment, the front support member 434 may be attached to the first plate 411 by means of bonding or taping. According to an embodiment, the display 430 may be attached to the upper portion of the front support member 434 by means of bonding or taping.

According to various embodiments, the second plate 421 of the second structure 420 may be movably disposed to the first plate 411. According to an embodiment, the sub support member 464 may be fixed to the second plate 421 by means of a screw S between the window cover 450 and the first plate 411. According to an embodiment, at least part of the display 430 may be attached to the sub support member 464 between the window cover 450 and the sub support member 464 by means of bonding or taping. For example, the display 430 attached to the front support member 434 may include the aforementioned planar portion (e.g., the planar portion 431 of FIG. 4), and the display 430 attached to the sub support member 464 may include at least part of the aforementioned bendable portion (e.g., the bendable portion 432 of FIG. 4) and a circuit portion (e.g., the circuit portion 433 of FIG. 4).

Figure 5C:
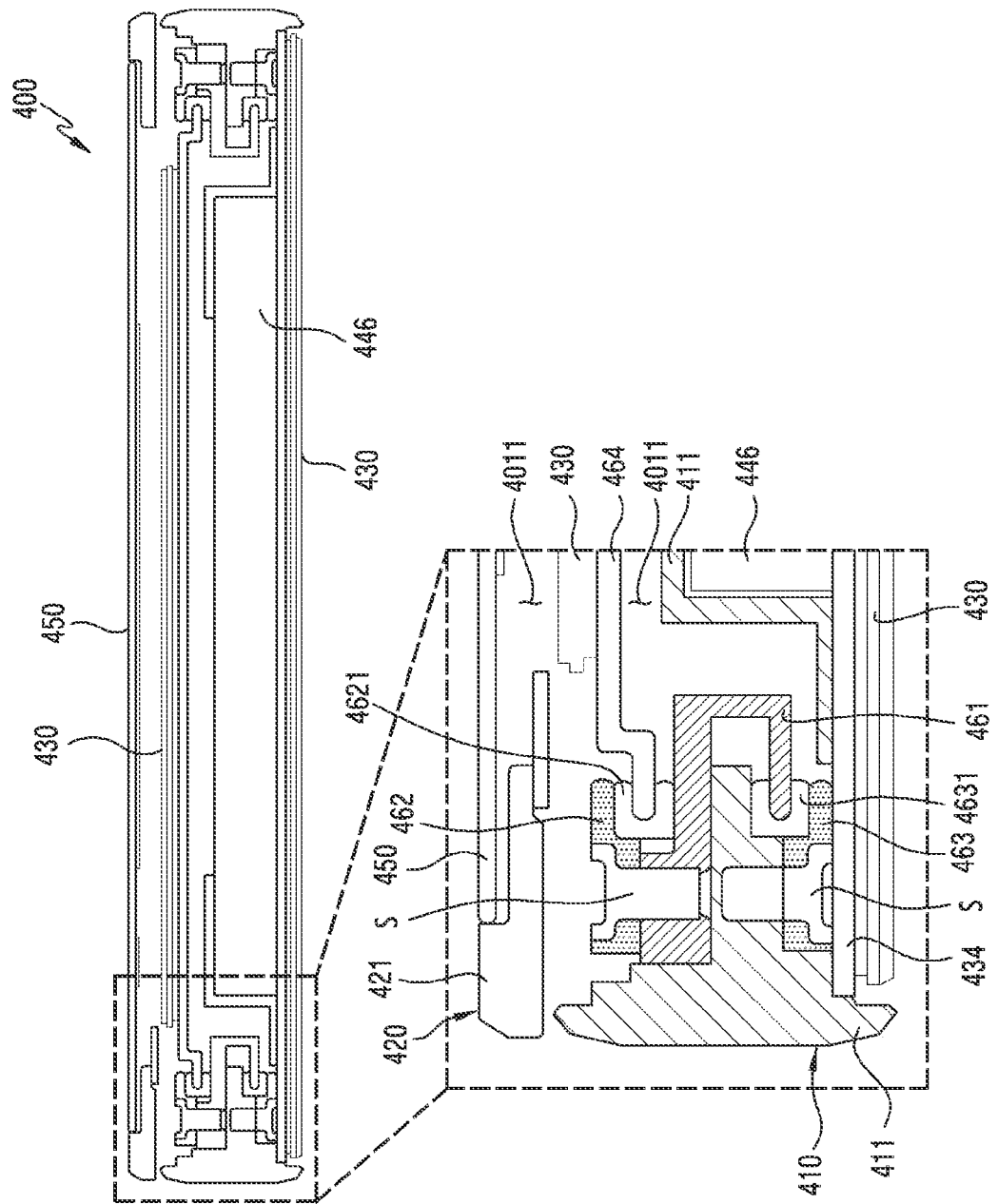
FIG. 5C is a cutaway cross-sectional view illustrating a portion of FIG. 5A according to various embodiments of the present disclosure.

FIG. 5C is a cross-sectional view cut along the line B-B' of FIG. 5A.

Referring to FIG. 5C, the sub support member 464 may be movably disposed to the inner support member 461 disposed to a space 4011 between the first plate 411 and the second plate 421 in a first direction (e.g., the direction ① of FIG. 4). According to an embodiment, the sub support member 464 may be fixed such that both ends thereof are movable by means of the pair of first rails 462 fixed to an end of the inner support member 461 by means of a screw S. According to an embodiment, since a bearing member 4621 (e.g., a POM member) is interposed between the first rail 462 and the sub support member 464, a smooth movement of the sub support member 464 may be induced. According to an embodiment, the inner support member 461 may be fixed such that both ends thereof are movable by means of the pair of second rails 463 fixed to the first plate 411 by means of the screw S. According to an embodiment, since a bearing member 4631 (e.g., a POM member) is interposed between the second rail 463 and the inner support member 461, a smooth movement of the inner support member 461 may be induced. According to an embodiment, when an operation in which the first structure 410 is open or closed with respect to the second structure 420 is performed, the sub support member 464 may move in a first direction with respect to the inner support member 461, and the inner support member 461 moves in the first direction with respect to the first plate 411, thereby performing an operation in which the first structure 410 is open or closed in the first direction with respect to the second structure 420.

Figure 5D:
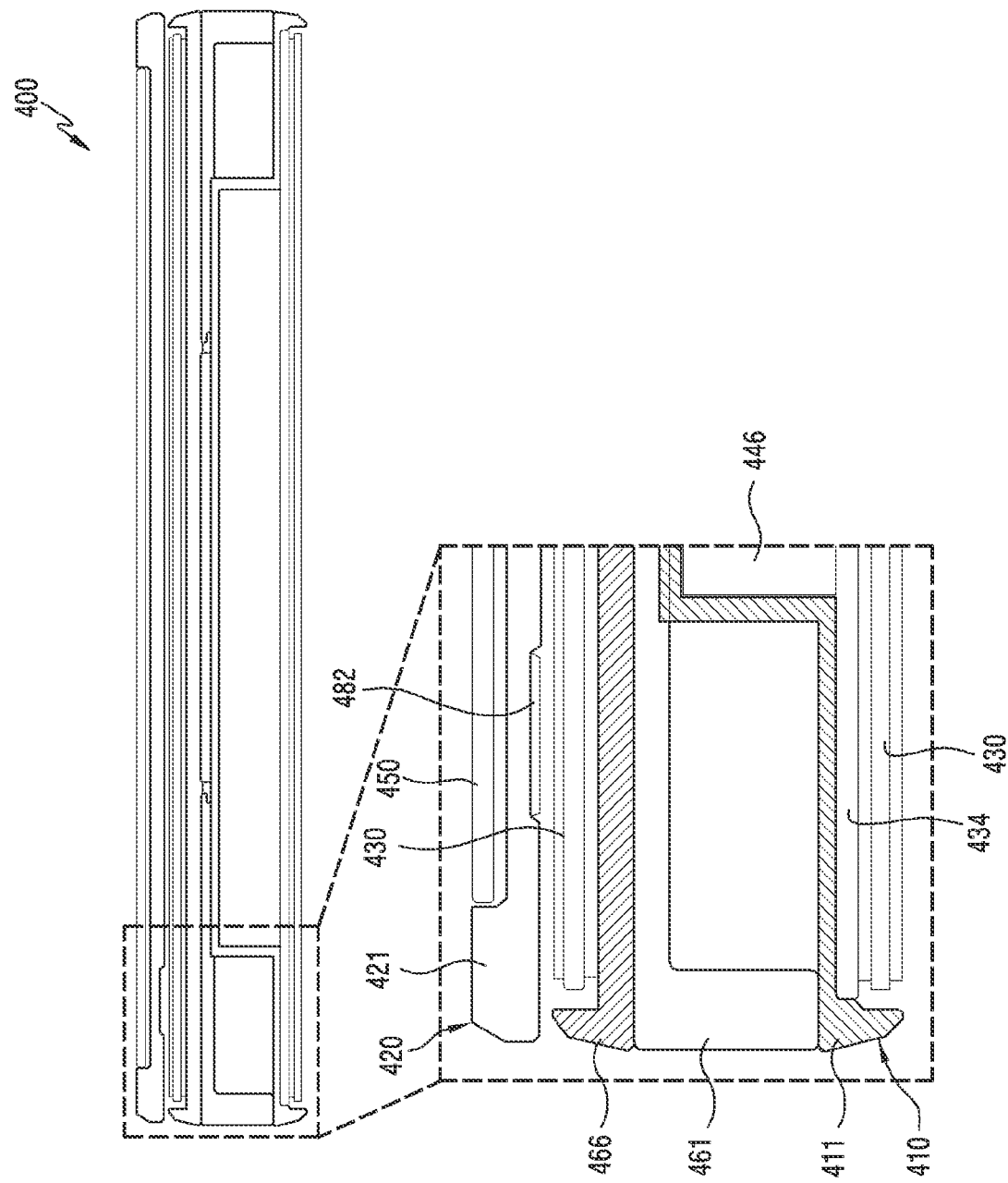
FIG. 5D is a cutaway cross-sectional view illustrating a portion of FIG. 5A according to various embodiments of the present disclosure.
Figure 5E:
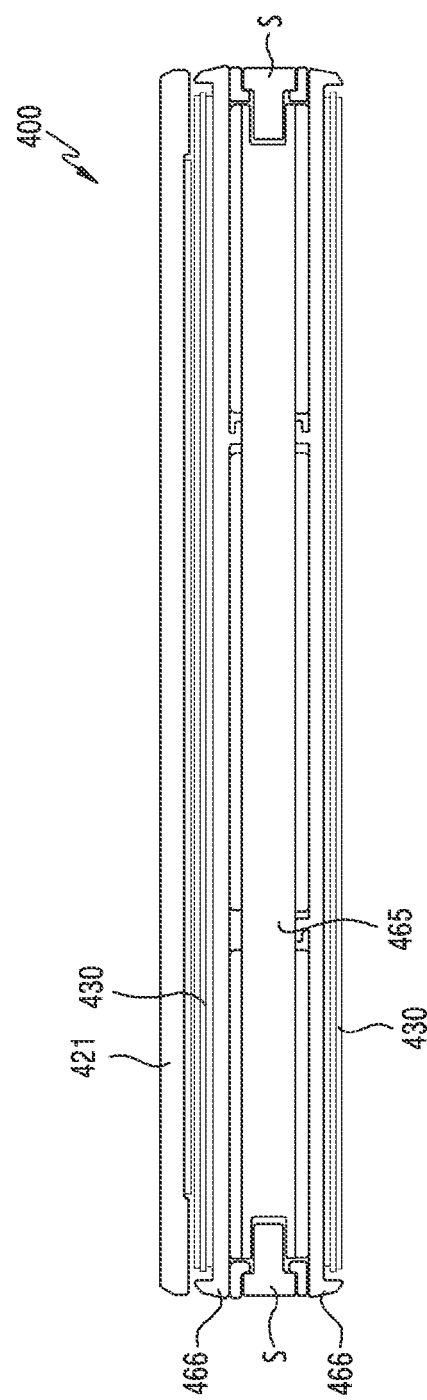
FIG. 5E is a cutaway cross-sectional view illustrating a portion of FIG. 5A according to various embodiments of the present disclosure.

FIG. 5D is a cross-sectional view cut along the line C-C' of FIG. 5A, and FIG. 5E is a cross-sectional view cut along the line D-D' of FIG. 5A.

Referring to FIG. 5D and FIG. 5E, the multi-joint module 466 may be disposed to be in contact along an outer face of the inner support member 461. According to an embodiment, the roller 465 may be disposed to an end portion of the inner support member 461. According to an embodiment, the roller 465 may be fixed in a self-rotatable manner at an end portion of the inner support member 461 by means of a screw S. For example, the multi-joint module 466 may be easily guided in a rolled (or bent) manner along an outer face of the roller 465 which is rotatable depending on a movement of the inner support member 461.

Figure 6:
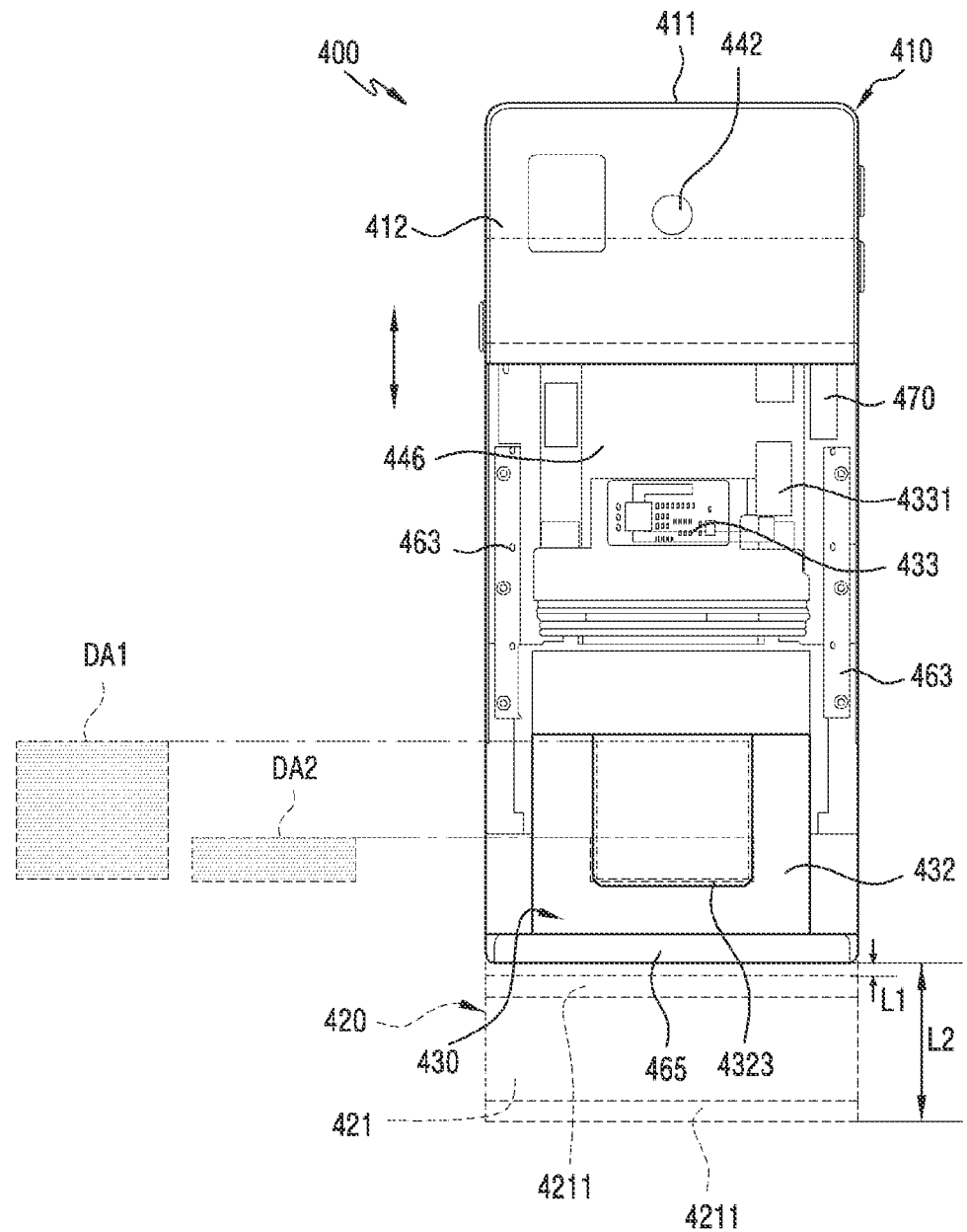
FIG. 6 illustrates a rear face of an electronic device in a state where a second plate is removed according to various embodiments of the present disclosure.

FIG. 6 illustrates a rear face of an electronic device in a state where a second plate is removed according to various embodiments of the present disclosure.

Referring to FIG. 6, the electronic device 400 may have the second rail 463 disposed at both ends of the first plate 411. According to an embodiment, the electronic device 400 may have the battery 446 disposed through an opening at a center of the first plate 411. The display 430 may be bent through the roller 465, and may be disposed to extend in a direction of the rear window 412 in the second face 4112 of the first plate 411 by means of the bendable portion 432 and the circuit portion 433 and connector 4331 disposed to an end portion of the bendable portion 432. According to an embodiment, the electronic device 400 may be disposed such that the electrical connection member 470 is exposed in part to the outside of the rear window 412.

According to various embodiments, the display area 4323 disposed to the bendable portion 432 may change depending on an opening/closing operation of the first structure 410. For example, as illustrated, a display area DA2 of a state where the first structure 410 is open may be controlled to be less than a display area DA1 of a state where the first structure 410 is closed. However, without being limited thereto, if the display area 4323 of the display 430 is constructed to have a length including an opening/closing movement distance of the first structure 410 in an arrow direction illustrated, the electronic device (e.g., the processor) may provide control to perform only a movement of an image displayed to a display area depending on a movement of the bendable portion 4323 without a change in a size of the display area 4323.

According to various embodiments, the first structure 410 may move between an open state and closed state with respect to the second state 421. According to an embodiment, when the first structure 410 is in the closed state with respect to the second structure 420, the first structure 410 may be positioned at a first distance L1 from the first side wall 4211. According to an embodiment, when the first structure 410 is in the open state with respect to the second structure 420, the first structure 410 may be positioned at a second distance L2, which is greater than the first distance L1, from the first side wall 4211.

Figure 7:
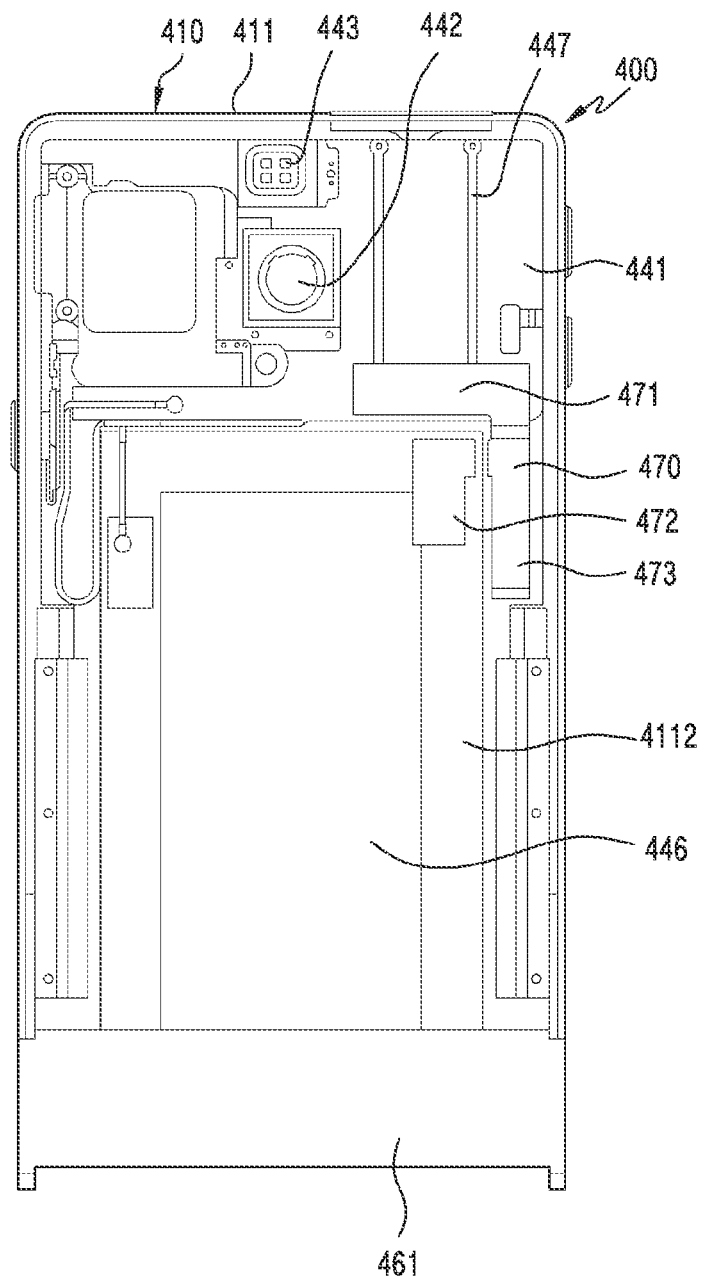
FIG. 7 illustrates a rear face of an electronic device in a state where a display and a rear window are removed in a state of FIG. 6 according to various embodiments of the present disclosure.

FIG. 7 illustrates a rear face of an electronic device in a state where a display and a rear window are removed in a state of FIG. 6 according to various embodiments of the present disclosure.

Referring to FIG. 7, the electronic device 400 may have a plurality of electronic components disposed between the second face 4112 of the first plate 411 and the rear window 412. According to an embodiment, the electronic components may include the PCB 441, the camera module 442, the receiver 443, or the card tray 447. The other electronic components described above (e.g., the key module, the speaker module, or the sensor module) may be disposed between the PCB 441 and the second face 4112 of the first plate 411.

According to various embodiments, the electronic connection member 470 may be disposed to couple the PCB 441 and the connector 4331 disposed to the circuit portion 433 of the display 430. According to an embodiment, the electrical connection member 470 may include a first connector 471 electrically connected to the PCB 441, a bent portion 473 extending from the first connector 471 to accommodate a reciprocating movement distance of the display 430 (e.g., the circuit portion 433), and a second connector 472 extending from the bent portion 473 and connected to the connector 4331 of the display 430. According to an embodiment, the electrical connection member 470 may be constructed of a Flexible Printed Circuit Board (FPCB). According to an embodiment, the bent portion 473 may be constructed in a 'U' or 'S' shape.

FIG. 8A and FIG. 8B illustrate a state where a front support member and a battery are mounted to a first plate according to various embodiments of the present disclosure.

Referring to FIG. 8A and FIG. 8B, the first support member 434 may be disposed to the first face 4111 of the first plate 411 to accommodate a planar portion (e.g., the planar portion 431 of FIG. 4) of a display (e.g., the display 430 of FIG. 4). According to an embodiment, the front support member 434 may be attached to the first face 4111 of the first plate 411 by means of bonding or taping. According to an embodiment, the first plate 411 may have the opening 4113 constructed to have a specific size, and a battery mounting portion 4115 may be disposed to accommodate a boundary of the battery 446 along a boundary of the opening 4113. According to an embodiment, the opening 4113 may be constructed to have a size to cope with a swelling phenomenon of the battery 446.

Figure 9A:
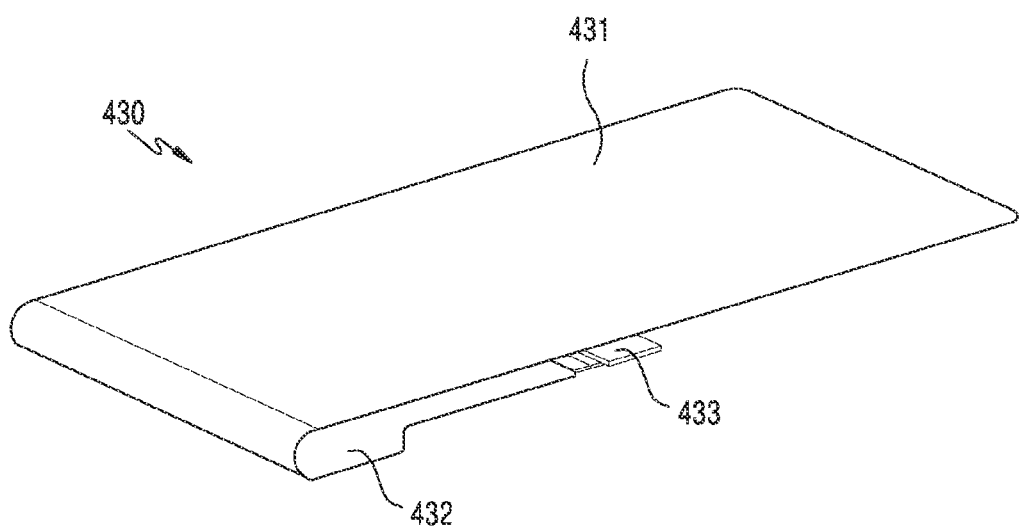
FIG. 9A illustrates a structure of a display according to various embodiments of the present disclosure.
Figure 9B:
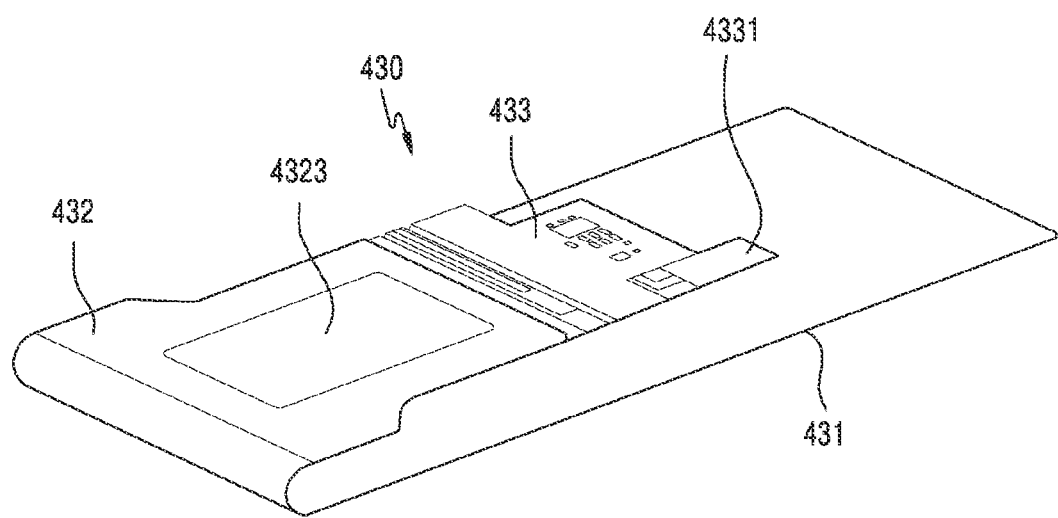
FIG. 9B illustrates a structure of a display according to various embodiments of the present disclosure.
Figure 9C:
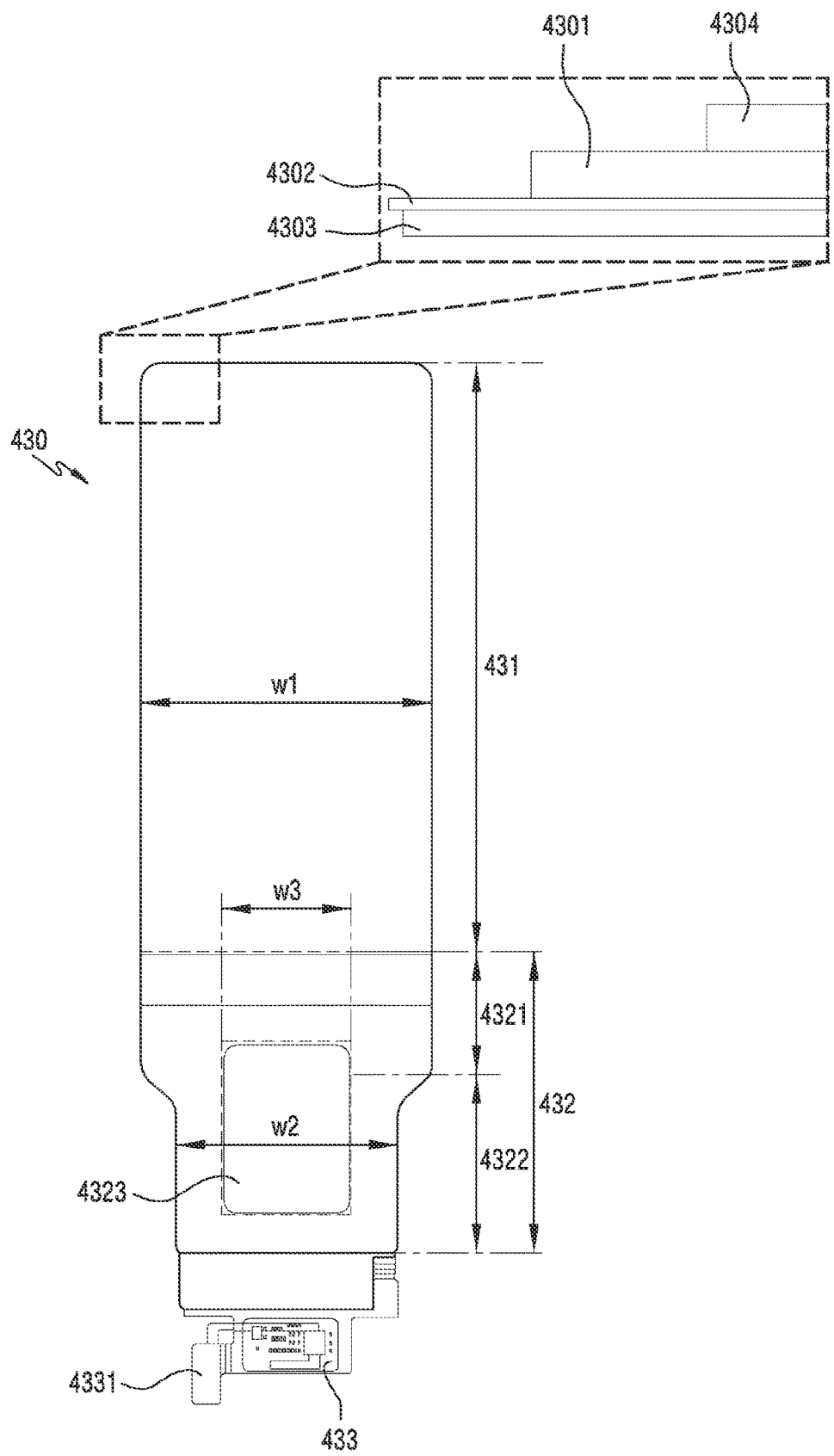
FIG. 9C illustrates a structure of a display according to various embodiments of the present disclosure.

FIG. 9A to FIG. 9C illustrate a structure of a display according to various embodiments of the present disclosure.

Referring to FIG. 9A to FIG. 9C, in the display 430, an area disposed to a first plate (e.g., the first plate 411 of FIG. 4) and an area exposed through a window cover (e.g., the window cover 450 of FIG. 4) disposed to a second plate (e.g., the second plate 421 of FIG. 4) may be constructed in an integral manner. According to an embodiment, the display 430 may include the planar portion 431 having a first width W1 and the bendable portion 432 extending from the planar portion 431. According to an embodiment, the bendable portion may have the first portion 4321 having the same width as the first width W1 and the second portion 4322 having a second width W2 less than the first width W1. According to an embodiment, the second portion 4322 of the bendable portion 432 may be exposed at least in part through the through-hole 451 of the window cover 450 disposed to the second plate 421. According to an embodiment, the display area 4323 disposed to the bendable portion 432 may change depending on an opening/closing operation of the first plate 411. According to an embodiment, the circuit portion 433 may be disposed to an end portion of the bendable portion 432. For example, the circuit portion 433 may include a Display Driver (DD) ID or a Touch Display Driver IC (TDDI).

According to various embodiments, the display 430 may include a flexible display. According to an embodiment, since at least part (e.g., the bendable portion) of the display 430 is movable depending on an opening/closing operation of the first plate 411, an additional protective window may not be disposed. According to an embodiment, the display 430 may have a flexible window 4302 and protective film 4303 sequentially stacked to an upper portion of a display panel 4301. The front support member (e.g., the front support member 434 of FIG. 4) and a rear face of the display 430 in contact with the front support member (e.g., the front support member 434 of FIG. 4) may be constructed to be protected by a cushion member 4304.

Figure 10A:
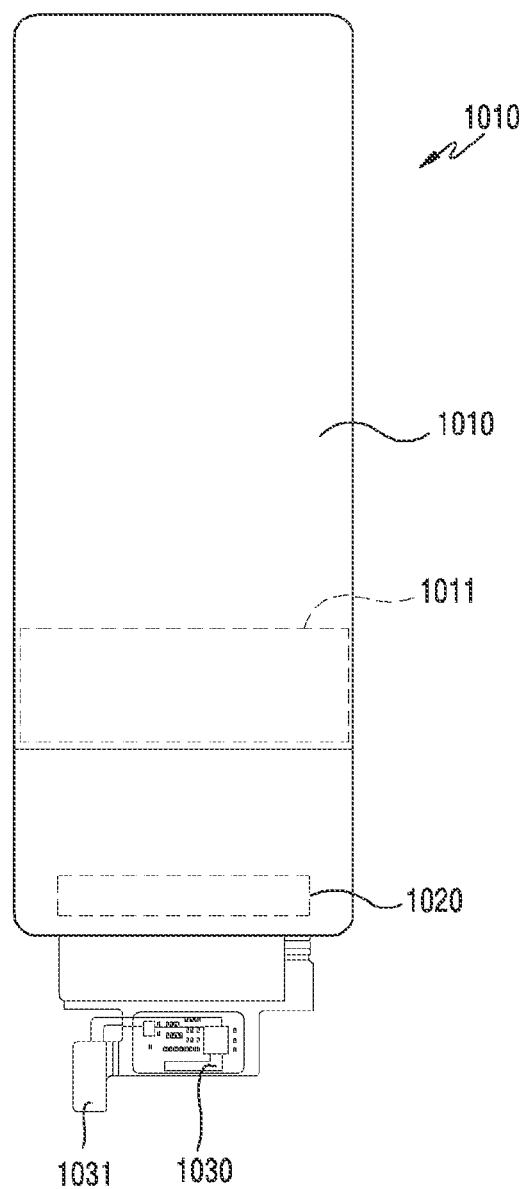
FIG. 10A and FIG. 10B illustrates a structure of a display according to various embodiments of the present disclosure.
Figure 10B:
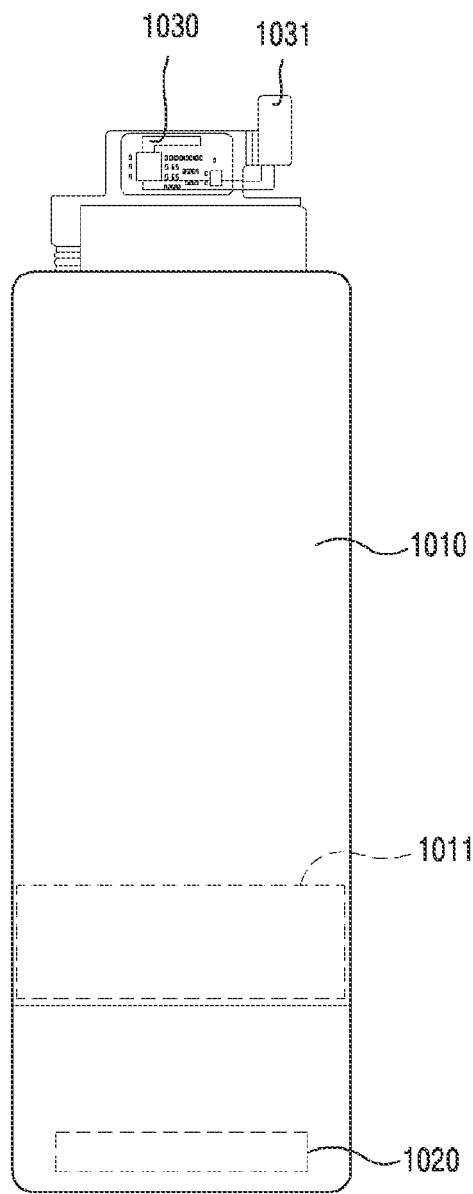

FIG. 10A and FIG. 10B illustrate a structure of a display according to various embodiments of the present disclosure.

In case of the display 430 of FIG. 9A to FIG. 9C, a display area disposed to the planar portion 431 and a display area disposed to the bendable portion 432 may be disposed as one display area controlled together.

In the display 430 of FIG. 10A, a display area 1010 disposed to a first plate (e.g., the first plate 411 of FIG. 4) and an extended display area 1011 extending when the first plate 411 is open are constructed as one display area. A display area 1020 displayed through a second plate (e.g., the second plate 421 of FIG. 4) may be implemented as a minimum display area constructed additionally.

As illustrated in FIG. 10B, in a display 1000, a circuit portion 1030 and connector 1031 conventionally disposed to a lower side may be disposed to an upper side of the display 1000.

Figure 11:
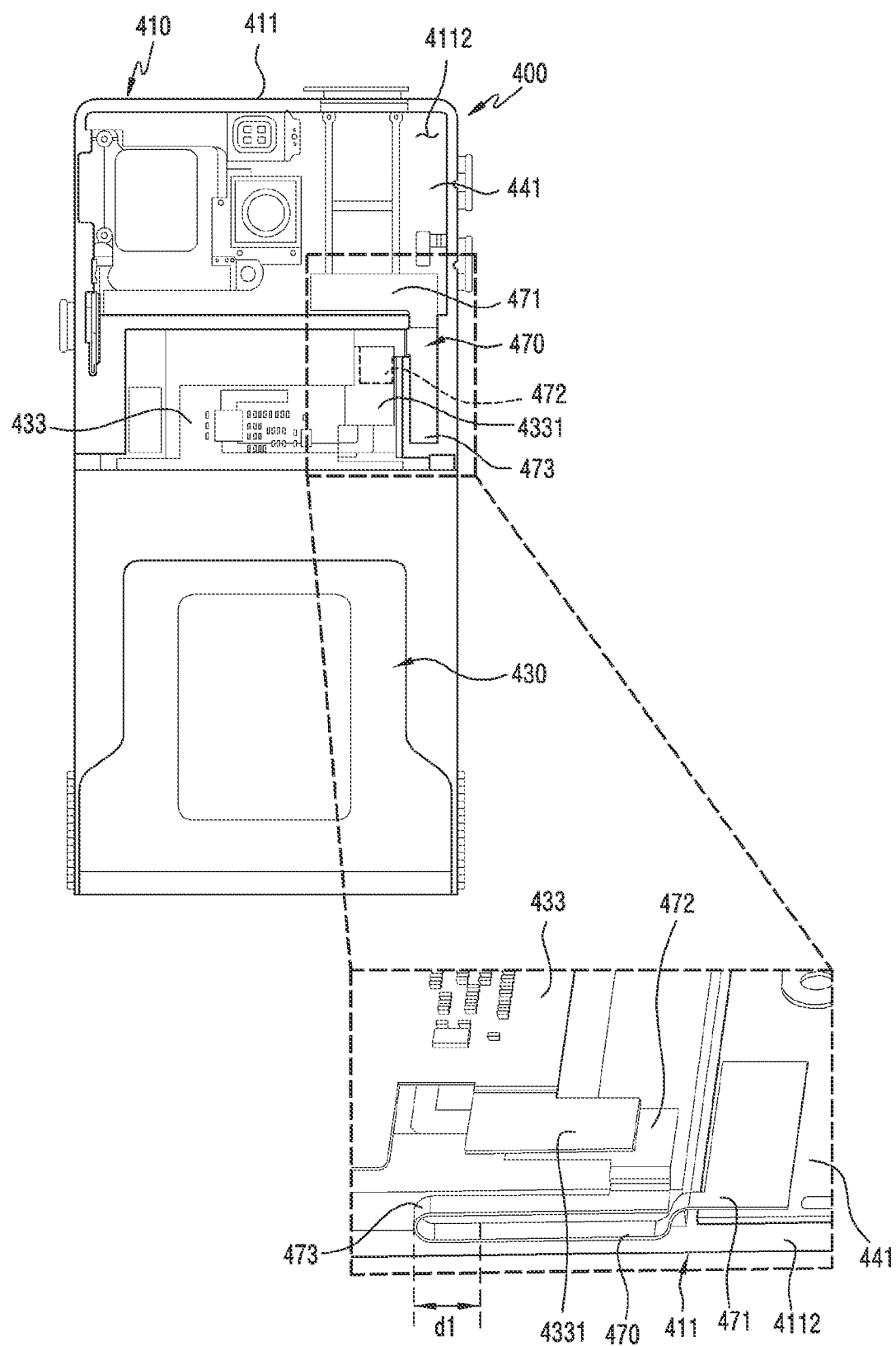
FIG. 11 illustrates an electrical connection relationship of a display and a PCB according to various embodiments of the present disclosure.

FIG. 11 illustrates an electrical connection relationship of a display and a PCB according to various embodiments of the present disclosure.

Referring to FIG. 11, the bendable portion 432 and circuit portion 433 of the display 430 may move reciprocally by a specific distance depending on an opening/closing operation of the first structure 410. For example, the display 430 may be fixed to a sub support member (e.g., the sub support member 464 of FIG. 4) which moves together with a second plate (e.g., the second plate 421 of FIG. 4), and the PCB 441 may be fixed to the first plate 411. According to an embodiment, the electrical connection member 470 may be included to reliably maintain an electrical connection between the display 430 and the PCB 441 while accommodating a reciprocating movement distance of the first plate 411.

According to various embodiments, the electrical connection member 470 may include the first connector 471 electrically connected to the PCB 441, the bent portion 473 extending from the first connector 471 to accommodate a reciprocating movement distance of the display 430 (e.g., the circuit portion 433), and the second connector 472 extending from the bendable portion 472 and connected to the connector 4331 of the display 430. According to an embodiment, the electrical connection member 470 may be constructed as a Flexible Printed Circuit Board (FPCB). According to an embodiment, the bent portion 473 may be constructed in a 'U' or 'S' shape having a bent shape of a self-movement distance d1 capable of sufficiently accommodating a movement distance of the first plate 411.

Figure 12A:
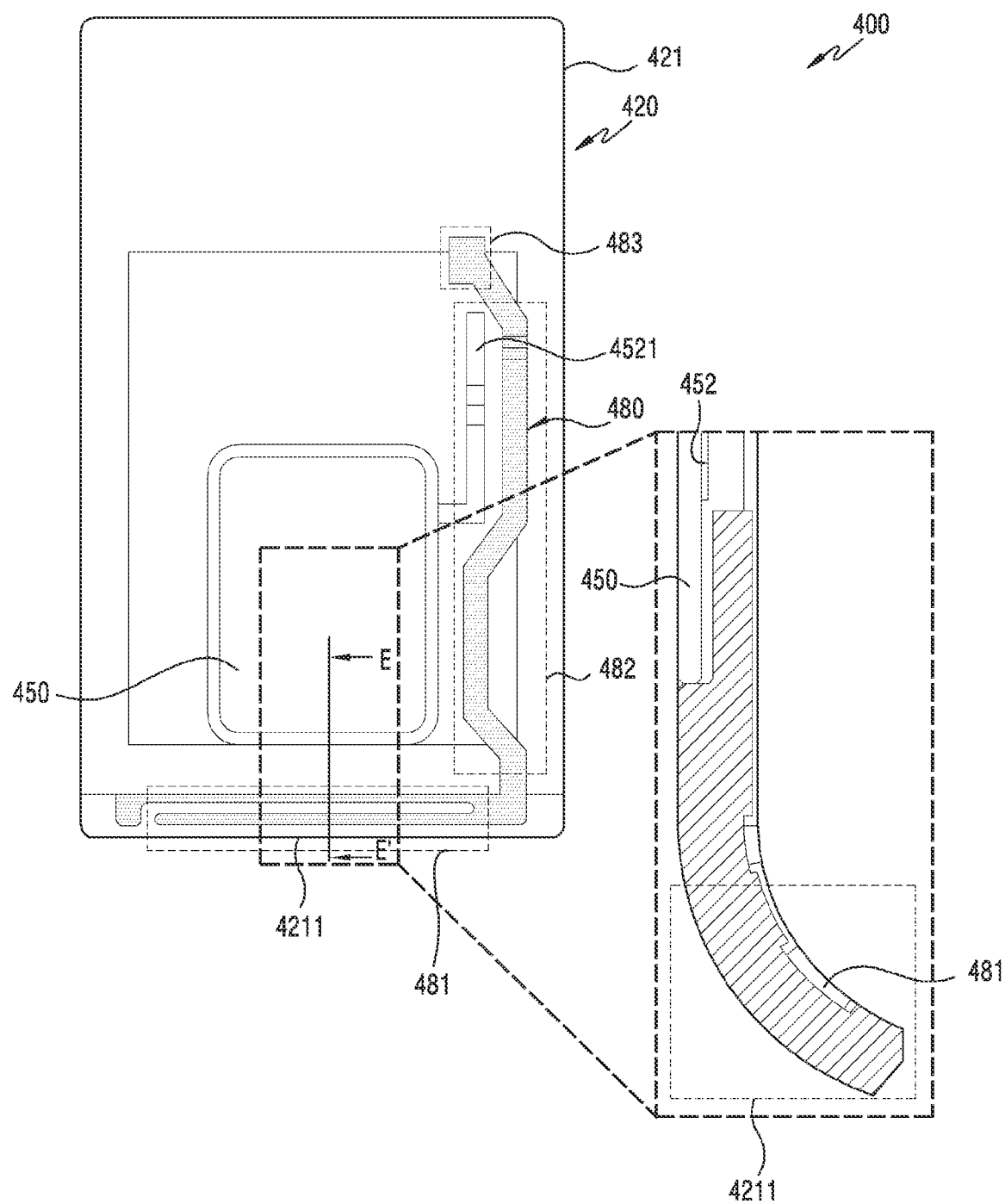
FIG. 12A illustrates an arrangement structure of an antenna module according to various embodiments of the present disclosure.
Figure 12B:
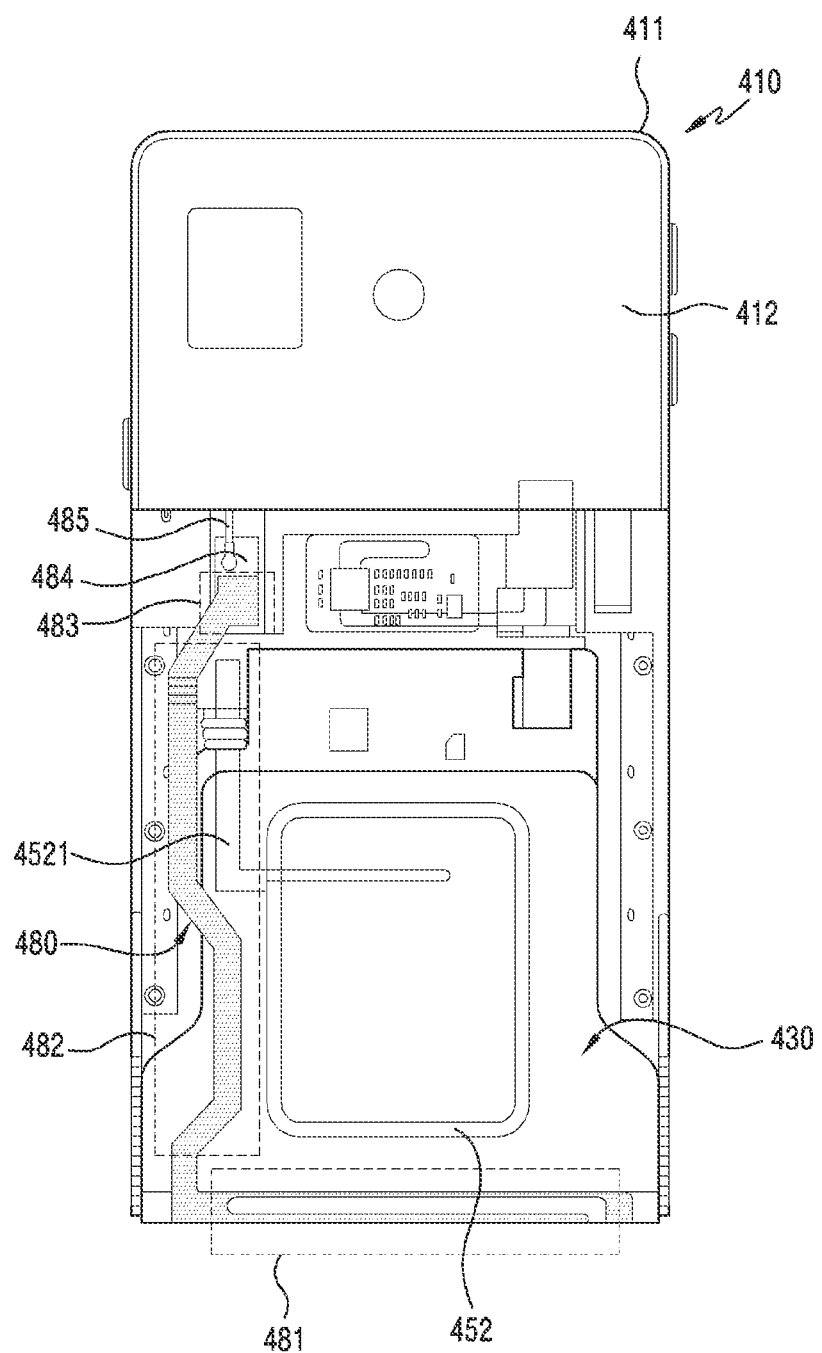
FIG. 12B illustrates an arrangement structure of an antenna module according to various embodiments of the present disclosure.
Figure 12C:
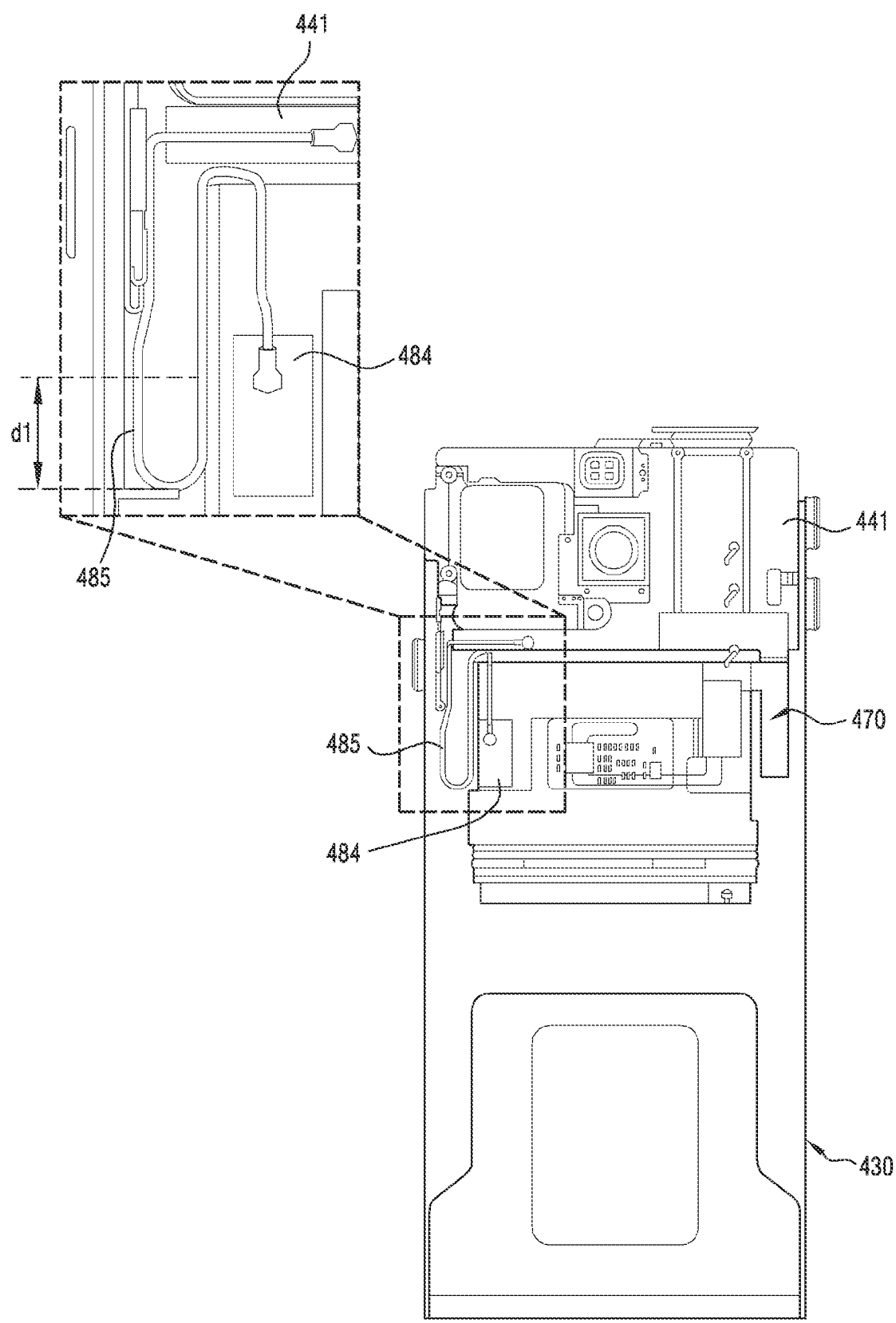
FIG. 12C illustrates an arrangement structure of an antenna module according to various embodiments of the present disclosure.

FIG. 12A to FIG. 12C illustrate an arrangement structure of an antenna module according to various embodiments of the present disclosure. FIG. 12A may include a cross-sectional view seen from the line E-E' in an area indicated by a dotted line.

Referring to FIG. 12A to FIG. 12C, the electronic device 400 may include the antenna module 480. According to an embodiment, the antenna module 480 may be disposed to the first side wall 4211 of the second plate 421 in a width direction. According to an embodiment, the antenna module 480 may include the radiation pattern 481 disposed to an inner face of the first side wall 4211, the FPCB 482 extending from the radiation pattern 481 to the vicinity of the PCB 441, and the connector 483 disposed to an end portion of the FPCB 482. According to an embodiment, the window cover 450 may be disposed to at least a partial area of the second plate 421 of the second structure 420. According to an embodiment, the touch sensor 452 may be disposed to the rear face of the window cover 450. According to an embodiment, the radiation pattern 481 may be disposed to the inner face of the first side wall 4211 in a Laser Direct Structuring (LDS) form, a Thin Film Antenna (TFA) form, a Flexible Printed Circuit Board (FPCB) form, or a Steel Use Stainless (SUS) form.

According to an embodiment, the FPCB 482 of the antenna module 480 may be disposed by avoiding the through-hole 451 which is a display area of the window cover 450. The FPCB 482 of the antenna module 480 may be electrically coupled to the sub PCB 484 disposed to the sub support member 464 in the vicinity of the PCB 441. According to an embodiment, the sub PCB 484 may be electrically coupled to a wireless communication circuit (e.g., RFIC) of the PCB 441 by means of a coaxial cable 485 electrically coupled thereto. For example, the radiation pattern 481 may be electrically coupled to the wireless communication circuit through the FPCB 482, the connector 483, the sub PCB 484, the coaxial cable 485, and the PCB 441. According to an embodiment, since the sub support member 464 having the sub PCB 484 fixed thereto moves together when the first structure 410 is open or closed, the coaxial cable 485 may be constructed of a material having high flexibility. According to an embodiment, the coaxial cable 485 may include a bent portion having a bent shape of a self-movement distance d1 capable of sufficiently accommodating a movement distance of the first plate 411. According to an embodiment, the coaxial cable 485 may be replaced with an FPCB having high flexibility.

Figure 13:
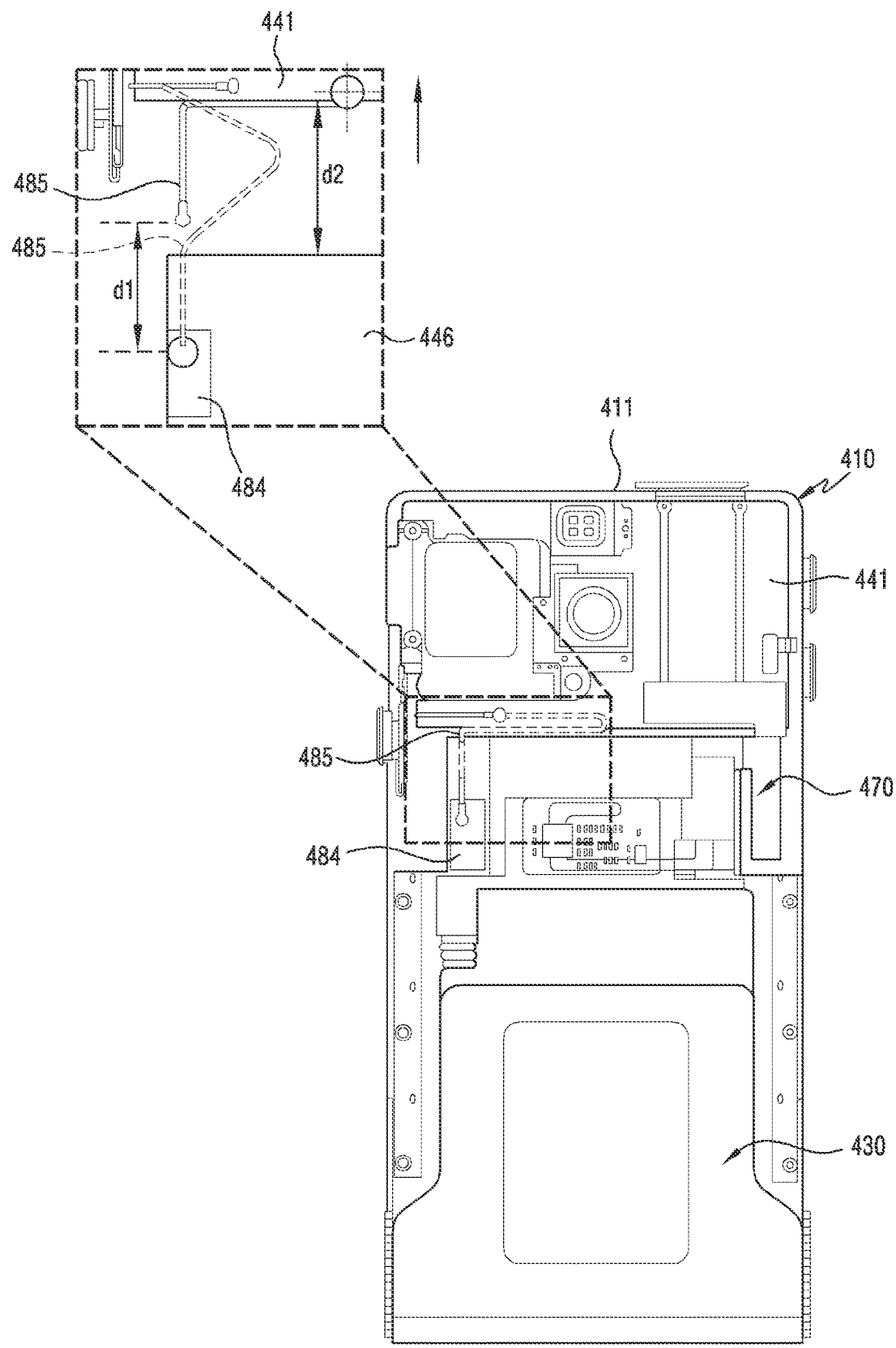
FIG. 13 illustrates an arrangement structure of an antenna module according to various embodiments of the present disclosure.

FIG. 13 illustrates an arrangement structure of an antenna module according to various embodiments of the present disclosure.

Referring to FIG. 13, the sub PCB 484 is fixed to an inner support member (e.g., the inner support member 461 of FIG. 4), and the battery 446 moves together with the inner support member 461. According to an embodiment, when the first plate 411 is open, the battery 446 of the inner support member 461 which moves together with a second plate (e.g., the second plate 421 of FIG. 4) also moves together, thereby providing a separation space d2 which is to be spaced apart from the PCB 441. For example, the coaxial cable 485 of which both ends are coupled respectively to the sub PCB 484 and the PCB 441 may be disposed such that a bent portion is accommodated to the aforementioned separation space d2. According to an embodiment, when the first plate 411 is in an open state, substantially most part of the coaxial cable 485 may be accommodated extendedly by utilizing the separation space d1, and when the first plate 411 is in a closed state, the substantially most part of the coaxial cable 485 may be accommodated to a space between the PCB 441 and the first plate 411.

Figure 14A:
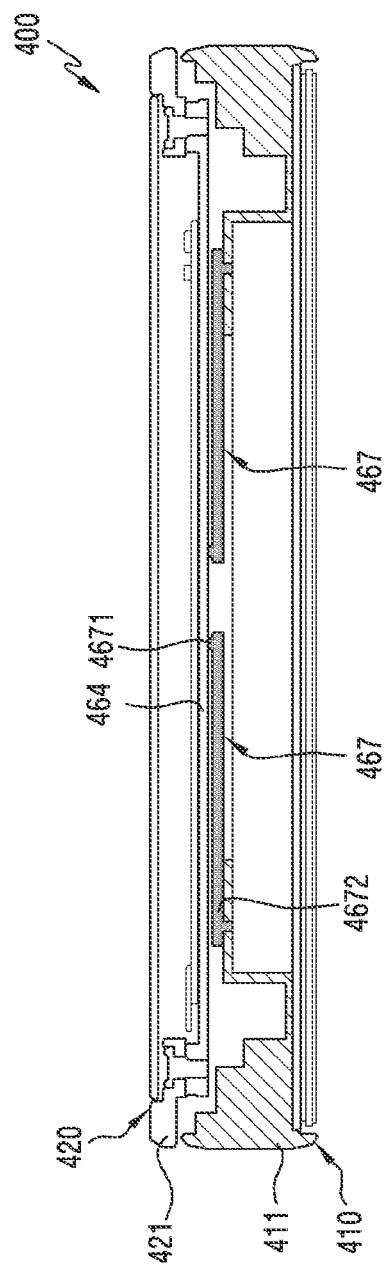
FIG. 14A is a cross-sectional view of an electronic device illustrating an arrangement structure of an actuator according to various embodiments of the present disclosure.
Figure 14B:
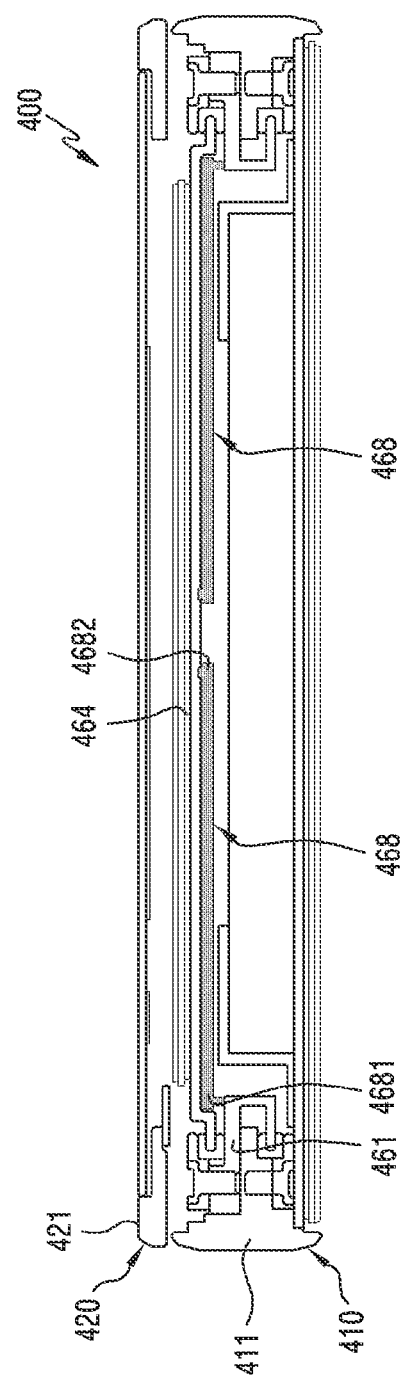
FIG. 14B is a cross-sectional view of an electronic device illustrating an arrangement structure of an actuator according to various embodiments of the present disclosure.
Figure 14C:
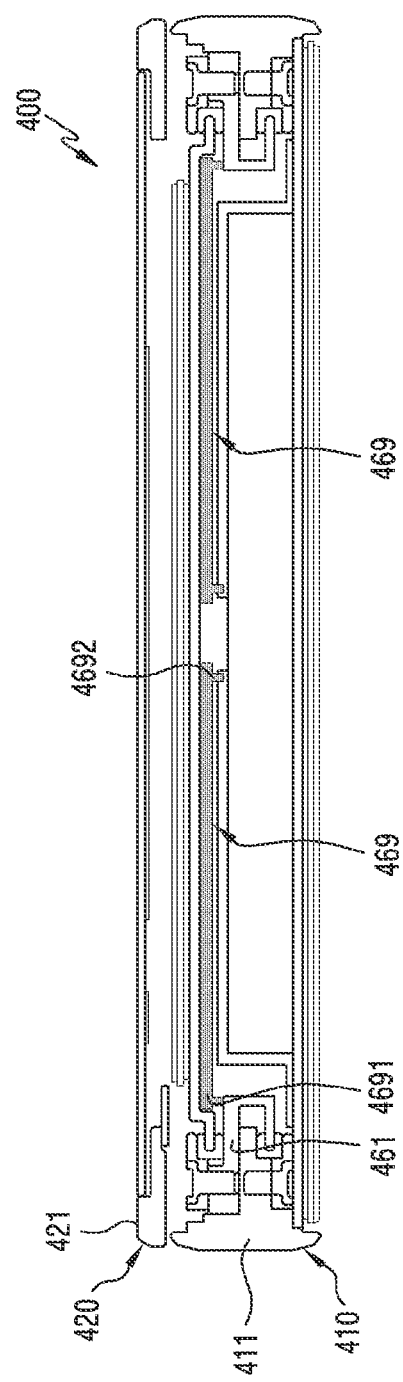
FIG. 14C is a cross-sectional view of an electronic device illustrating an arrangement structure of an actuator according to various embodiments of the present disclosure.

FIG. 14A to FIG. 14C are cross-sectional views of an electronic device illustrating an arrangement structure of an actuator according to various embodiments of the present disclosure.

According to various embodiments, actuators 467, 468, and 469 may be provided to a space between the first structure 410 and the second structure 420 to persistently provide pressing force to the first structure 410, which is to be open or closed in a sliding manner with respect to the second structure 420, in a direction of being open or closed based on a specific inflection portion.

Referring to FIG. 14A, the actuator 467 may be disposed to a space between the first plate 411 and the sub support member 464. According to an embodiment, one end 4671 of the actuator 467 may be rotatably disposed to the sub support member 464, and the other end 4672 may be rotatably disposed to the first plate 411.

Referring to FIG. 14B, the actuator 468 may be disposed to a space between the inner support member 461 and the sub support member 464. According to an embodiment, one end 4681 of the actuator 468 may be rotatably disposed to the inner support member 461, and the other end 4682 may be rotatably disposed to the sub support member 464.

Referring to FIG. 14C, the actuator 469 may be disposed to a space between the inner support member 461 and the first plate 411. According to an embodiment, one end 4691 of the actuator 469 may be rotatably disposed to the inner support member 461, and the other end 4692 may be rotatably disposed to the first plate 411.

According to various embodiments, the actuators 467, 468, and 469 may include a link member or a torsion spring to persistently provide pressing force in a proceeding direction based on a specific inflection portion.

According to various embodiments, an electronic device (e.g., the electronic device 400 of FIG. 4) may include a first structure (e.g., the first structure 410 of FIG. 4) including a first plate (e.g., the first plate 411 of FIG. 4) including a first face (e.g., the first face 4111 of FIG. 4) and a second face (e.g., the second face 4112 of FIG. 4) facing away from the first face, and a second structure (e.g., the second structure 420 of FIG. 4) including a second plate (e.g., the second plate 421 of FIG. 4), which faces the second face of the first plate and has an opening (e.g., the opening 4214 of FIG. 4) formed therein, and a first side wall (e.g., the first side wall 4211 of FIG. 4) extending from a first end portion of the second plate. The first structure may be movable between an open state and a closed state with respect to the second structure in a first direction (e.g., the direction ① of FIG. 4) with respect to the second plate. The second structure may be positioned at a first position (e.g., the first distance L1 of FIG. 6) from the first side wall when the first structure is in the closed state and positioned at a second distance (e.g., the second distance L2 of FIG. 6), which is greater than the first distance, from the first side wall when the first structure is in the open state. The electronic device may further include a flexible touch screen display (e.g., the flexible touch screen display 430 of FIG. 4). The flexible touch screen display may include a planar portion (e.g., the planar portion 431 of FIG. 4) extending across at least part of the first face, mounted to the first face, and having a first width (e.g., the first width W1 of FIG. 4) in a second direction (e.g., the direction ② of FIG. 4) perpendicular to the first direction, and a bendable portion (the bendable portion 432 of FIG. 4) extending from the planar portion and positioned from the planar portion to the inside of a space between the first side wall and the first structure when in the closed state. The bendable portion may include a first portion (e.g., the first portion 4321 of FIG. 4) extending from one end of the planar portion and having the same width as the first width, and a second portion (e.g., the second portion 4322 of FIG. 4) extending from the first portion, facing the second plate, and having a second width less than the first width. The second portion of the bendable portion may be exposed visually at least in part to the outside of the electronic device through the opening of the second plate. At least part of the first portion of the bendable portion may be configured to construct substantially the same plane as the planar portion when the first structure transitions from the closed state to the open state.

According to various embodiments, the planar portion may include an active area having a fourth width and an inactive area having a fifth width and adjacent to the active area in the first direction. The third width of the first portion of the bendable portion may be less than the fourth width of the active area.

According to various embodiments, the electronic device may further include a Printed Circuit Board (PCB) (e.g., the PCB 441 of FIG. 4) disposed on the first structure, and a wireless communication circuit (e.g., the wireless communication module 192 of FIG. 1) disposed on the PCB.

According to various embodiments, at least a partial area of the first side wall may be constructed as an electrical conductive path, and may be electrically coupled to the wireless communication circuit through the electrical conductive path.

According to various embodiments, at least the partial area may construct at least part of an antenna (e.g., the antenna 480 of FIG. 4) constructed in an inner face facing the first structure of the first side wall.

According to various embodiments, the electrical conductive path may be disposed between the bendable portion and the second plate so as not to be visually exposed to the outside through the opening.

According to various embodiments, the electrical conductive path may construct a flat Flexible Printed Circuit Board (FPCB).

According to various embodiments, a first area of the electrical conductive path may construct a flat FPCB, and another partial area of the second area of the electrical conductive path may construct a coaxial cable which is bent when in the closed state and unfolded when in the open state.

According to various embodiments, the opening may have a third width (e.g., the third width W3 of FIG. 4) less than the second width in the second direction.

According to various embodiments, the electronic device may further include a front support member (e.g., the front support member 434 of FIG. 4) disposed to the first face of the first plate, a sub support member (e.g., the sub support member 464 of FIG. 4) disposed to the second plate, and an inner support member (e.g., the inner support member 461 of FIG. 4) movably disposed in the first direction with respect to the sub support member and the first plate between the sub support member and the second face of the first plate. The display may have the planar portion attached to the front support member and the bendable portion attached to the sub support member along an inner face of the first side wall.

According to various embodiments, the electronic device may further include at least one first rail (e.g., the first rail 462 of FIG. 4) disposed to guide the sub support member by being fixed to the first face of the inner support member, and a second rail (e.g., the second rail 463 of FIG. 4) disposed to guide the inner support member by being fixed to the first plate.

According to various embodiments, the electronic device may further include an actuator (e.g., the actuator 465 of FIG. 4) disposed between the second face of the first plate and the second plate to press in a direction in which the first plate moves.

According to various embodiments, the actuator may be disposed to at least one area between the inner support member and the sub support member or between the inner support member and the first plate.

According to various embodiments, the electronic device may further include a roller (e.g., the roller 465 of FIG. 4) rotatably disposed to an end portion of the inner support member, and a multi-joint module (e.g., the multi-joint module 466) surrounding at least in part the roller and disposed between the display and the roller to support a rear face of the display. A position at which the multi-joint module is bent may change depending on a movement of the sub support member along an outer circumferential face of the roller.

According to various embodiments, the electronic device may further include a PCB disposed to the second face of the first plate, and an electrical connection member (e.g., the electrical connection member 470 of FIG. 4) which electrically couples the PCB and a connector of a circuit portion disposed to the bendable portion of the display disposed to the sub support member.

According to various embodiments, the electrical connection member may include an FPCB having flexibility capable of accommodating a movement distance of the sub support member.

According to various embodiments, the electronic device may further include a PCB disposed to the second face of the first plate, at least one electronic component disposed to at least a partial area of the first side wall, a sub PCB disposed to the sub support member in the vicinity of the PCB, another electrical conductive path which electrically couples the at least one electronic component to the sub PCB, and an electrical connection member which electrically couples the sub PCB and the PCB and has flexibility capable of accommodating a movement distance of the sub PCB which moves along the sub support member.

According to various embodiments, an electronic device may include a first plate, a second plate movably coupled to overlap with at least a partial area in the first plate and including an opening, a rollable module disposed between the first plate and the second plate so that the first plate moves reciprocally by a specific movement distance with respect to the second plate, a display including a planar portion disposed to an outer face of the first plate and a bendable portion extending from the planar portion and having a display area visible from the outside through the opening between the rollable module and the second plate under the guidance of the rollable module, a PCB disposed to an area of the first plate not overlapping with the second plate, at least one electronic component disposed to at least a partial area of the second plate, and an electrical connection member which electrically couples the electronic component and the PCB.

The electronic component may be electrically coupled with the PCB through the electrical connection member disposed across an area other than the display area. The electrical connection member may include a material having flexibility capable of accommodating a reciprocating movement distance of the second plate.

According to various embodiments, the electronic component may include at least one of an antenna module, microphone module, speaker module, interface connector port, various sockets, and ear jack assembly exposed or protruding through at least a partial area of the first plate.

According to various embodiments, the bendable portion may be constructed to have a smaller width than the planar portion to guide a path of the electrical connection member.

While the disclosure has been shown and described with reference to various embodiments thereof, it will be understood by those of ordinary skill in the art that various changes in form and details may be made therein without departing from the spirit and scope of the disclosure as defined by the following claims and their equivalents.

What is claimed is:

1. A portable communication device comprising:
    a housing including a first housing portion and a second housing portion at least partially overlapped and slidable with each other;
    a rollable module accommodated in the housing substantially between the first housing portion and the second housing portion, the rollable module configured to slide the first housing portion or the second housing portion with respect to each other; and
    a flexible display accommodated in the housing such that, when in a closed state in which the first housing portion or the second housing portion is not slid with respect to each other, a first display portion of the flexible display is visually exposed via a first surface of the housing and a second display portion of the flexible display is visually exposed via a second surface of the housing opposite to the first surface.

2. The portable communication device of claim 1, wherein, when in an open state in which the first housing portion or the second housing portion is at least partially slid with respect to each other, at least part of a bendable portion extended from the first display portion toward the second display portion is visually exposed via the first surface concurrently with the first display portion.

3. The portable communication device of claim 2, wherein the bendable portion is larger than the second display portion.

4. The portable communication device of claim 2, wherein, when in the open state, at least one portion of a lateral surface of the rollable module is exposed to an outside of the portable communication device.

5. The portable communication device of claim 2, wherein, when in the open state, at least part of the second display portion is visually exposed via the first surface concurrently with the first display portion and the at least part of the bendable portion.

6. The portable communication device of claim 1, further comprising:
    a printed circuit board (PCB) disposed in the first housing portion;
    an antenna module disposed in in the second housing portion; and
    a flexible PCB (FPCB) substantially disposed in the second housing portion and connected between the antenna module and the PCB.

7. The portable communication device of claim 6, wherein the antenna module includes a radiation pattern forming a portion of an outer lateral surface of the second housing portion, and wherein the radiation pattern is connected with the PCB via the flexible PCB.

8. The portable communication device of claim 7, wherein the flexible PCB is movable according to the first housing portion or the second housing portion being slid with respect to each other.

9. The portable communication device of claim 2, further comprising:
    a display drive integrated circuit (DDI) disposed in a first ending portion of the first display portion opposite to the bendable portion.

10. The portable communication device of claim 2, further comprising:
    a display drive integrated circuit (DDI) disposed in a second ending portion of the second display portion opposite to the bendable portion.

11. The portable communication device of claim 2, wherein a first part of the bendable portion is concealed in the housing when in the closed state, and wherein a second part of the bendable portion is concealed in the housing when in the open state.

12. The portable communication device of claim 2, wherein the bendable portion is disposed between the first display portion and the second display portion.

13. The portable communication device of claim 2, wherein the bendable portion is disposed apart from the second display portion on the flexible display.

14. The portable communication device of claim 1, wherein the flexible display comprises a connector disposed at one end of the flexible display.

15. The portable communication device of claim 6, at least part of the FPCB comprises at least one bendable portion.

16. The portable communication device of claim 2, wherein, when in the open state or in the closed state, at least part of the FPCB is foldable or bendable.

17. The portable communication device of claim 1, wherein the rollable module comprises:
    a roller disposed in an end portion of the first housing portion; and
    a multi-joint module surrounding at least in part the roller, disposed between the flexible display and the roller to support a rear face of the flexible display.

18. The portable communication device of claim 17, wherein the rollable module further comprises:
    sub support member fixed in the first housing portion;
    inner support member that is movable disposed in sub support member; and
    at least one rail disposed between the sub support member and inner support member.

19. The portable communication device of claim 2, wherein the bendable portion comprises an extended display area.

20. The portable communication device of claim 19, wherein a display area of the second display portion is larger than the extended display area.

\* \* \* \* \*